(12) United States Patent
Mooney et al.

(10) Patent No.: US 7,744,145 B2
(45) Date of Patent: Jun. 29, 2010

(54) PANORAMIC RETRACTABLE TOP

(75) Inventors: Robert B. Mooney, Farmington Hills, MI (US); Troy Donavan Allan, Howell, MI (US); Robert Boyer Dickie, Canton, MI (US); Douglas Chester Carson, Pinckney, MI (US); David Lawrence Newkirk, Sterling, MI (US); John E. Long, Highland, MI (US)

(73) Assignee: Intier Automotive Closures Inc., Newmarket, Ontario (CA)

(*) Notice: Subject to any disclaimer, the term of this patent is extended or adjusted under 35 U.S.C. 154(b) by 966 days.

(21) Appl. No.: 10/573,105

(22) PCT Filed: Nov. 4, 2004

(86) PCT No.: PCT/CA2004/001919

§ 371 (c)(1),
(2), (4) Date: Mar. 23, 2006

(87) PCT Pub. No.: WO2005/042288

PCT Pub. Date: May 12, 2005

(65) Prior Publication Data

US 2007/0001476 A1 Jan. 4, 2007

(51) Int. Cl.
*B60J 7/047* (2006.01)
(52) U.S. Cl. .............. 296/107.18; 296/107.17
(58) Field of Classification Search ............ 296/107.08, 296/107.17, 107.18, 107.2, 220.01, 216.02, 296/216.03, 216.04, 216.05
See application file for complete search history.

(56) References Cited

U.S. PATENT DOCUMENTS

| 6,419,308 | B1 | 7/2002 | Corder et al. |
| 6,604,782 | B2 | 8/2003 | De Gaillard et al. |
| 6,672,658 | B2* | 1/2004 | De Gaillard ........... 296/220.01 |
| 6,921,123 | B2* | 7/2005 | Wagner ................. 296/107.17 |
| 7,140,666 | B2* | 11/2006 | Wulf et al. .................. 296/124 |
| 7,377,575 | B2* | 5/2008 | Queveau et al. ........ 296/107.18 |
| 2001/0040394 | A1* | 11/2001 | DeGaillard ............ 296/220.01 |
| 2002/0135200 | A1* | 9/2002 | De Gaillard ........... 296/107.01 |
| 2004/0130189 | A1* | 7/2004 | Bohm et al. ........... 296/220.01 |
| 2004/0145219 | A1* | 7/2004 | Doncov et al. ......... 296/220.01 |
| 2007/0210610 | A1* | 9/2007 | Bunsmann et al. ..... 296/107.18 |

\* cited by examiner

*Primary Examiner*—Jason S Morrow
(74) *Attorney, Agent, or Firm*—Clark Hill PLC

(57) ABSTRACT

A retractable roof assembly (53) is provided for a motor vehicle (10) having a rear seat (24) and spaced apart roof side frame members (30) defining a roof opening (31). The retractable roof assembly (53) includes a split rail assembly (33) having a fixed rail (34) adapted to be fixedly secured to each of the roof side frame members (30) and extending along a portion thereof, and a movable rail (40) extending rearward of the fixed rail (34) along a remaining portion of each of the roof side frame members (30). A plurality of roof panels (58, 60, 62) extends between the roof side frame members (30) and slidably engages the split rail assembly (33) for selective movement into a stacked configuration above the movable rail (40). A linkage assembly (254) is operably connected to the movable rail (40) for pivoting and articulating the movable rail (40) relative to the fixed rail (34) when the plurality of roof panels (58, 60, 62) is in the stacked configuration in order to stow the plurality of roof panels (58, 60, 62) behind the rear seat (24) of the motor vehicle (10) such that the entire roof opening (31) is exposed.

28 Claims, 31 Drawing Sheets

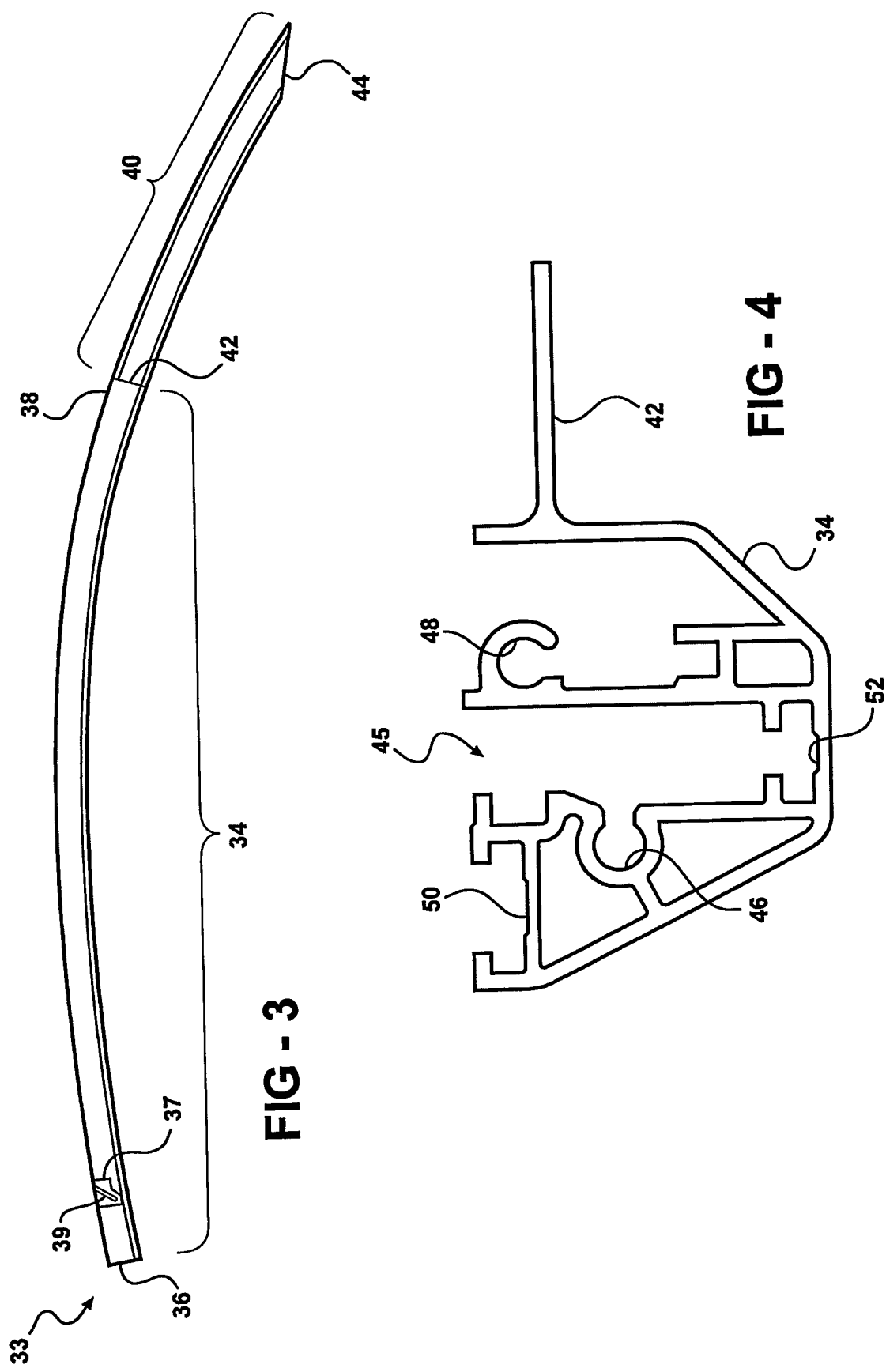

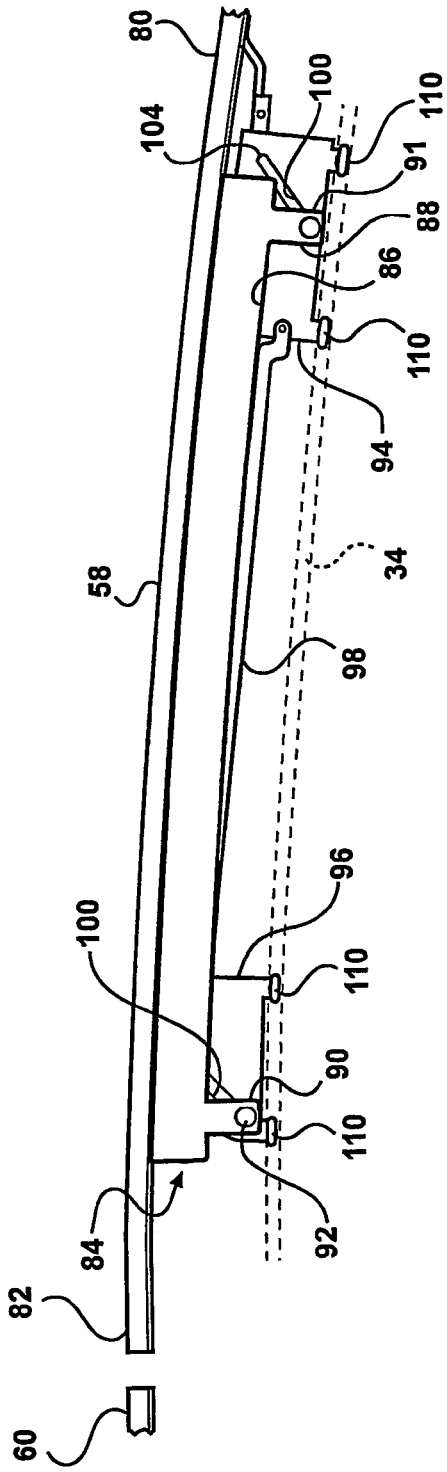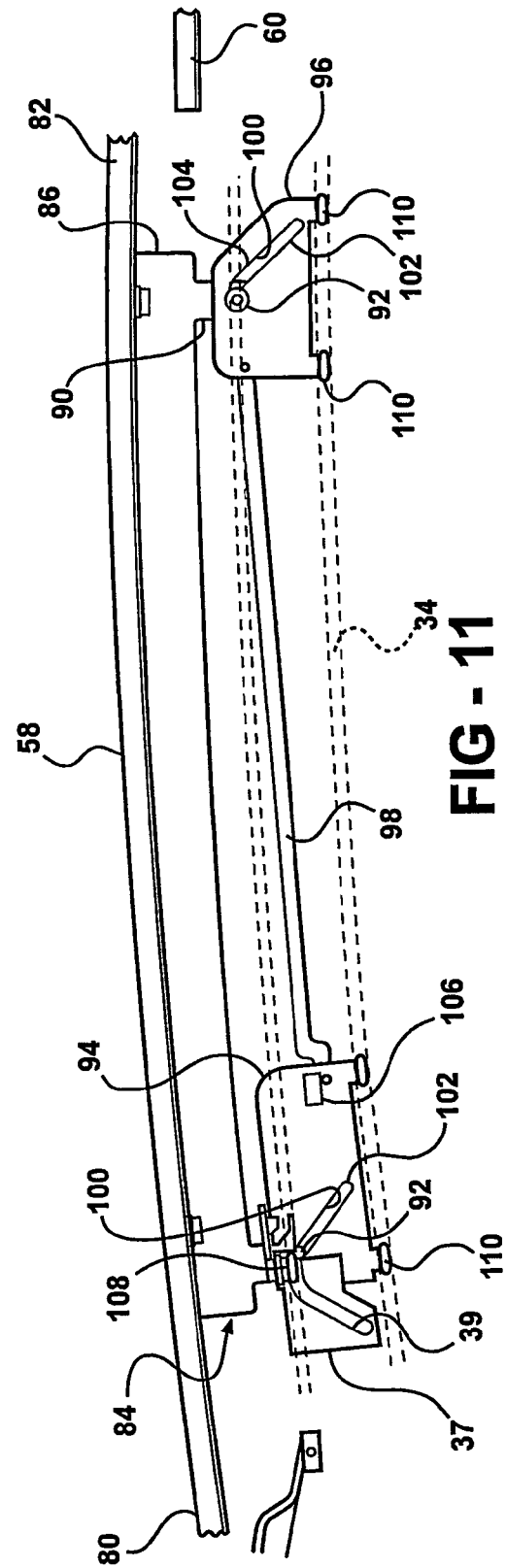

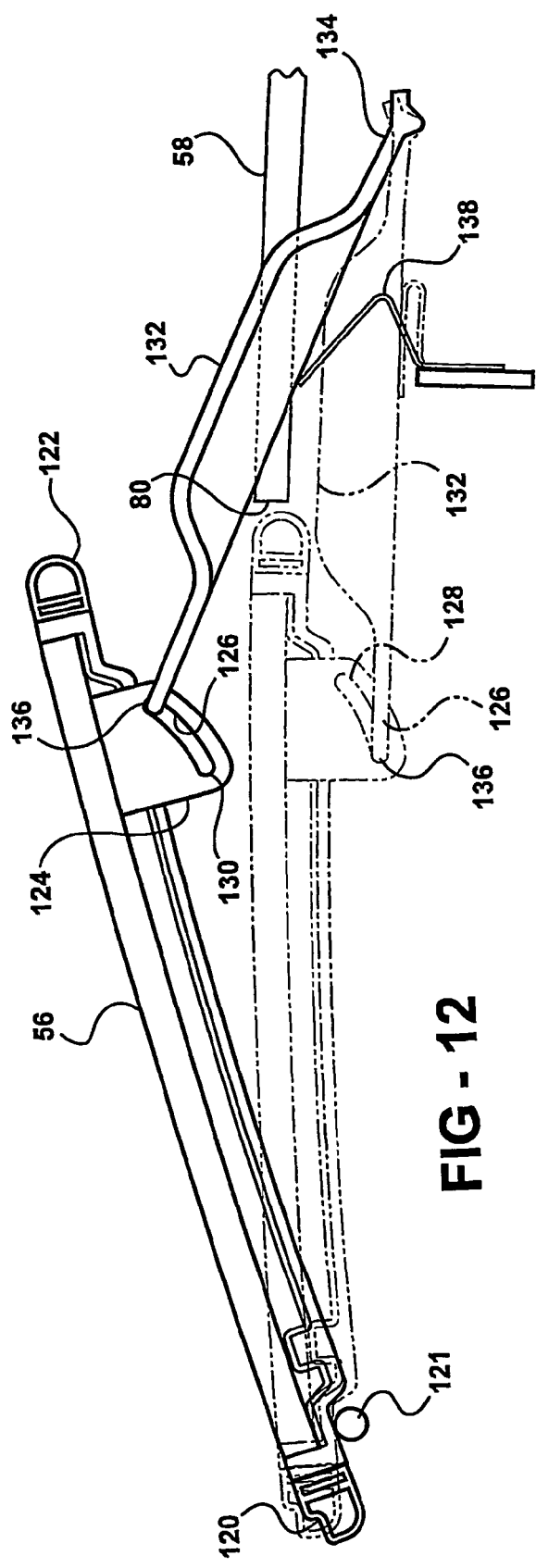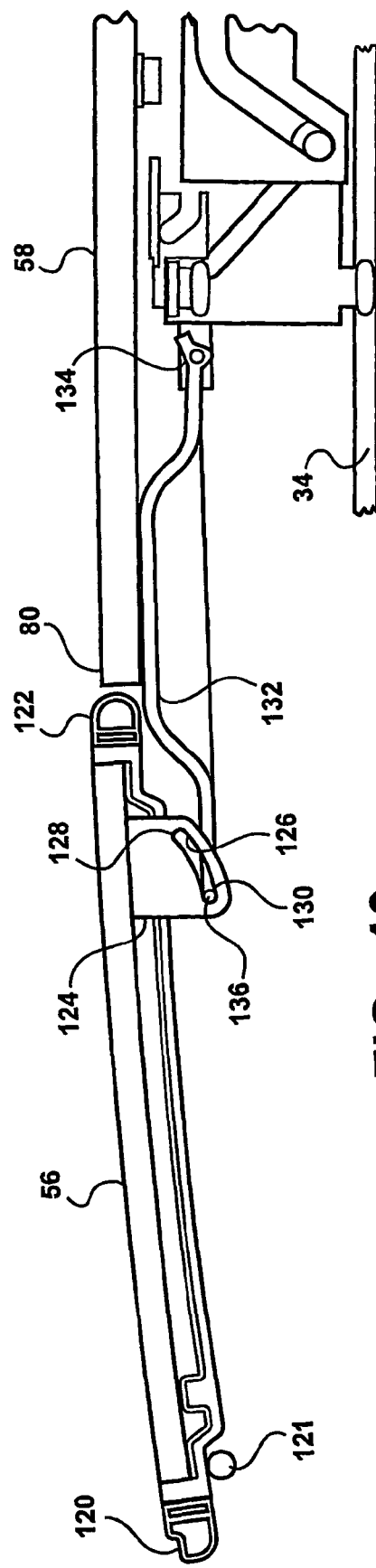

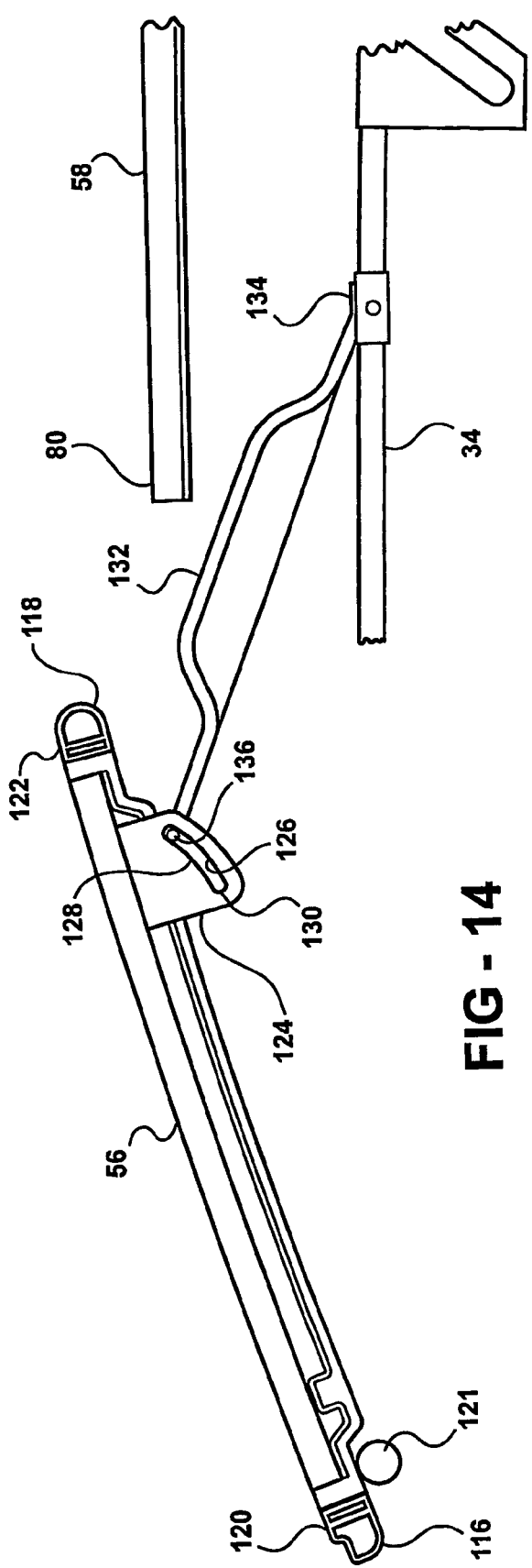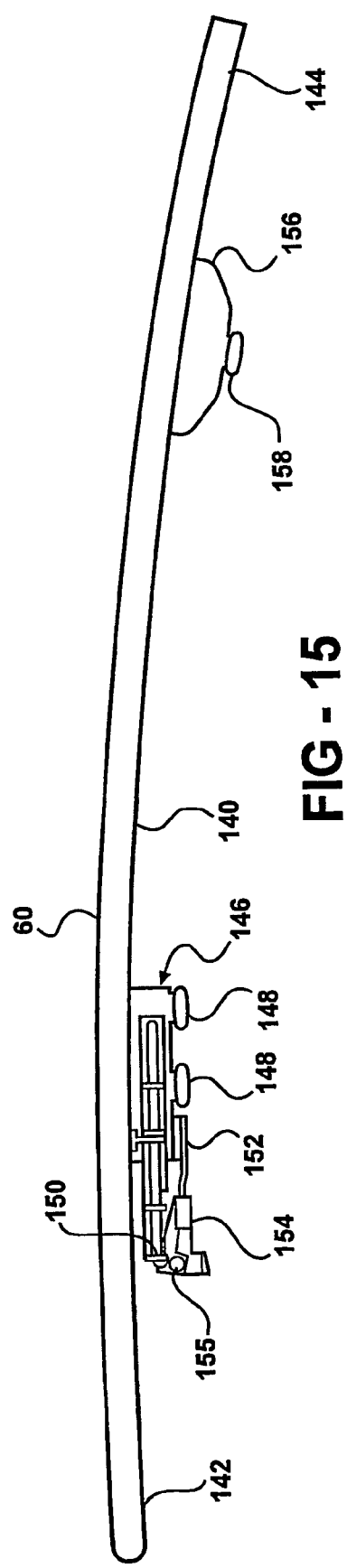

PANORAMIC RETRACTABLE TOP

FIELD OF THE INVENTION

The invention relates to a retractable roof for a motor vehicle. More particularly, the invention relates to a retractable roof that is movable into a sunroof position and a fully open position.

DESCRIPTION OF THE RELATED ART

Retractable roofs have become an increasingly popular accessory item for various motor vehicles. A retractable roof allows ventilation and/or sunlight to enter a passenger compartment in order to provide occupants thereof with added comfort. One example of a well-known retractable roof is a sunroof. Sunroofs typically include a closure panel that is movable, either manually or via an electric motor, relative to an opening in a roof The closure panel is movable between a closed position generally flush with the roof that completely covers the opening, and an open position rearward of the closed position for allowing ventilation and/or sunlight to enter the passenger compartment. In addition, the closure panel is typically positionable at one of a plurality of partially open positions between the closed and open positions.

Another well-known retractable roof is a convertible roof. In convertible roofs, the entire roof is moved into a rear portion of the motor vehicle to maximize the ventilation and/or sunlight provided to the occupants. Oftentimes, the retracted roof occupies a substantial portion of a luggage compartment of the motor vehicle, which is undesirable due to the resulting loss of available storage space. In other convertible roof approaches, the roof is moved to a vertical position behind either a front or rear seat. The appearance of the roof behind the front or rear seat in this approach is, however, not preferred from an aesthetic standpoint.

SUMMARY OF THE INVENTION

According to one aspect of the invention, a retractable roof assembly is provided for a motor vehicle having a rear seat and spaced apart roof side frame members defining a roof opening. The retractable roof assembly includes a split rail assembly having a fixed rail adapted to be fixedly secured to each of the roof side frame members and extending along a portion thereof and a movable rail extending rearward of the fixed rail along a remaining portion of each of the roof side frame members. A plurality of roof panels extends between the roof side frame members and slidably engages the split rail assembly for movement into a stacked configuration above the movable rail. A linkage assembly is operably connected to the movable rail for pivoting and articulating the movable rail relative to the fixed rail when the plurality of roof panels is in the stacked configuration in order to stow the plurality of roof panels behind the rear seat such that the entire roof opening is exposed.

According to another aspect of the invention, a split rail assembly is provided for a motor vehicle having spaced apart roof side frame members defining a roof opening and a plurality of roof panels selectively extending between the roof side frame members to cover the roof opening. The split rail assembly includes a fixed rail adapted to be fixedly secured to each of the roof side frame members and extending along a portion thereof. The split rail assembly also includes a movable rail extending rearward of the fixed rail along a remaining portion of each of the roof side frame members. The movable rail is pivotal relative to the fixed rail for moving the plurality of panels away from the roof side frame members to expose the roof opening.

According to still another aspect of the invention, there is provided a retractable roof for a motor vehicle having a roof opening and a rear seat. The retractable roof includes a plurality of roof panels movable between a closed position covering the roof opening, an intermediate position partially covering the roof opening, and a stowed position behind the rear seat to expose the entire roof opening. The retractable roof also includes a linkage assembly operably connected to the plurality of roof panels for pivoting the plurality of roof panels into the stowed position behind the rear seat of the motor vehicle.

According to yet another aspect of the invention, there is provided a method for retracting a roof having first, second, and third roof panels selectively covering a roof opening, into a space behind a rear seat of a motor vehicle. The method includes the steps of: raising the first roof panel relative to the second roof panel; sliding the first roof panel over the second roof panel to partially open the roof; coupling the first roof panel to the second roof panel; moving the coupled first and second roof panels against the third roof panel; and pivoting the first, second, and third panels into the space behind the rear seat to expose the entire roof opening.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a side view of the fixed and movable rails;

FIG. 4 is a cross-sectional view of the fixed rail taken along line 4-4 in FIG. 3;

FIG. 10 is an opposing, side view of the first panel and carrier assembly;

FIG. 11 is a side view of the carrier assembly raised relative to the fixed rail;

FIG. 12 is a side view of an air deflector in stowed and use positions;

FIG. 13 is a side view of the first panel holding the air deflector in the stowed position;

FIG. 14 is a side view of the air deflector in the use position after being freed by the first panel;

FIG. 15 is a side view of a second panel of the retractable roof and a coupling mechanism fixedly mounted to the second panel;

FIG. 23 is a perspective view of the package tray assembly with the package tray in the folded position;

DETAILED DESCRIPTION OF THE PREFERRED EMBODIMENT

Figure 1:
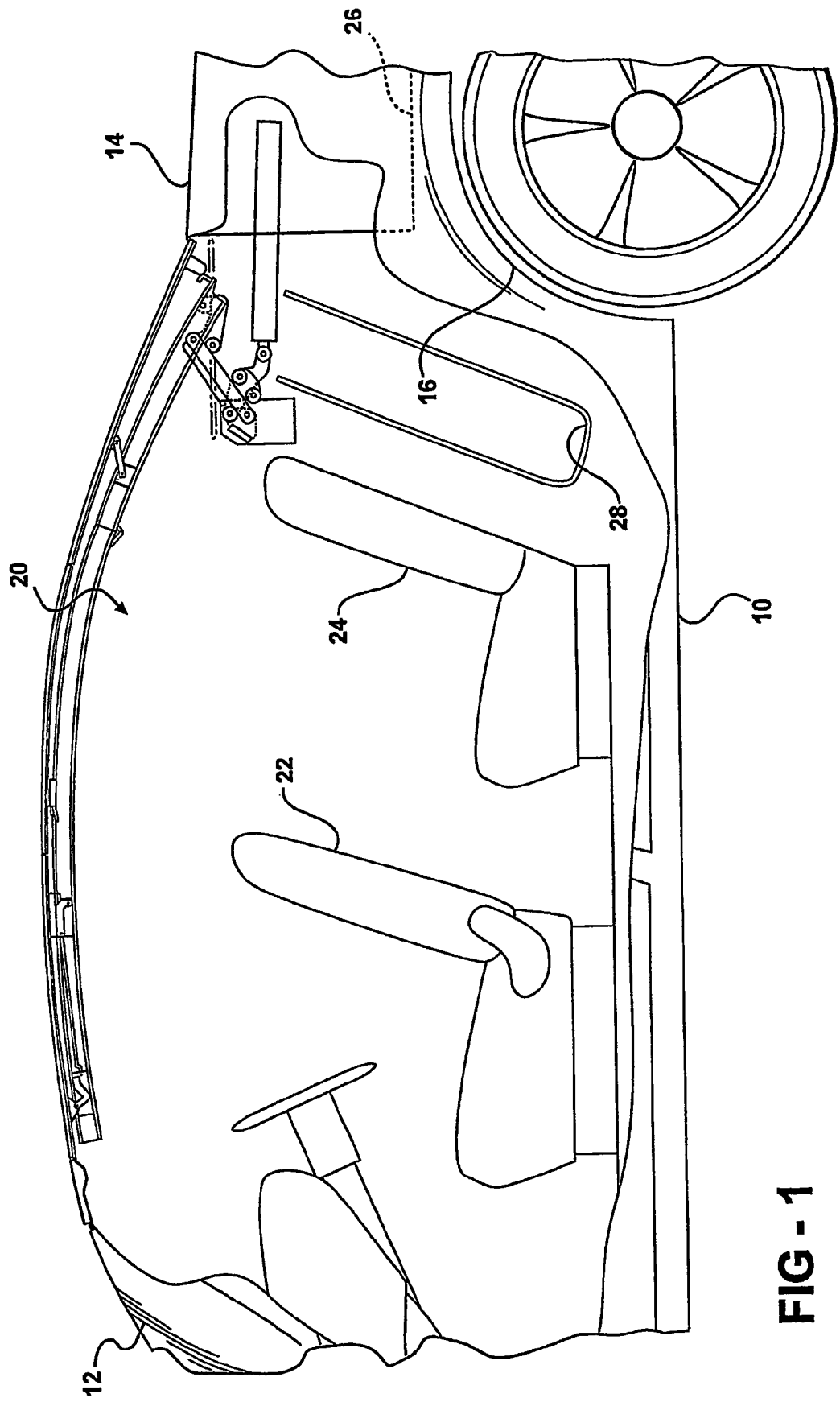
FIG. 1 is a side view of a motor vehicle including a retractable roof according to the invention.

Referring to FIG. 1, a motor vehicle 10 includes a front windshield 12, a rear decklid 14, and spaced apart, longitudinally extending sidewalls 16 (one shown in FIG. 1) extending therebetween. The front windshield 12 and the sidewalls 16 partially define a passenger compartment 20. The passenger compartment 20 includes front 22 and rear 24 seats disposed therewithin for supporting one or more occupants. It is, however, appreciated that the motor vehicle 10 may only include front seats 22. Thus, the motor vehicle 10 may have either two or four doors. A luggage compartment 26 is located rearward of the passenger compartment 20 and is selectively closed by the rear decklid 14. A receptacle 28 is positioned between the rear seat 24 and the luggage compartment 26. Although the receptacle 28 is shown as being a distinct compartment, it is hereby appreciated that the receptacle 28 could, in the alternative, be a space behind the rear seat 24 or a portion of the luggage compartment 26.

Figure 2:
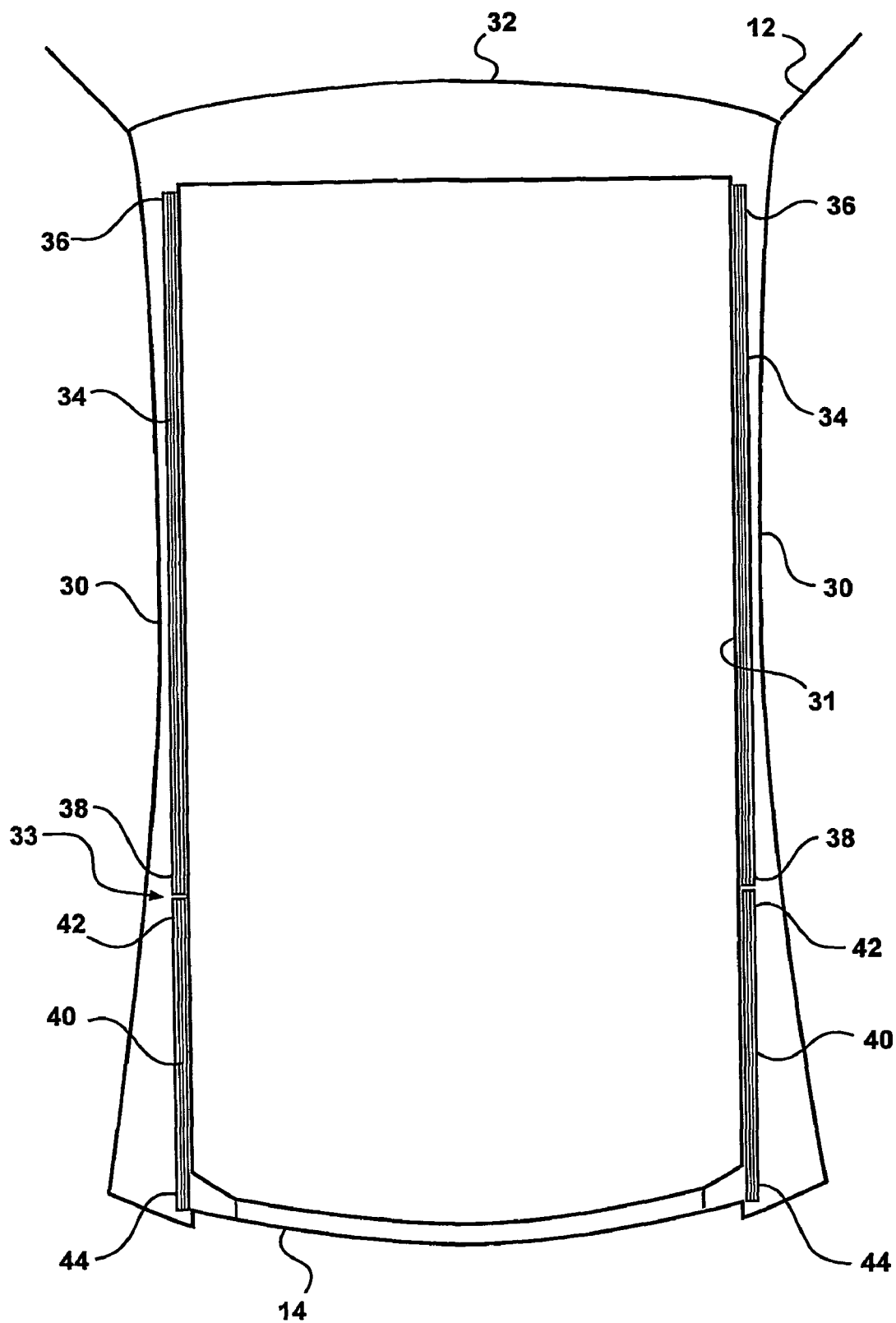
FIG. 2 is a top view of a motor vehicle including fixed and movable rails extending along a side frame member.

Referring to FIG. 2, a roof side frame member 30 is fixedly secured to each of the spaced apart sidewalls 16, 18. Each of the spaced apart side frame members 30 extends longitudinally between the front windshield 12 and the rear decklid 14. A metal header 32 is fixedly secured to the front windshield 12. The header 32 extends rearwardly from the front windshield 12 and laterally between the spaced apart side frame members 30. Together, the rear decklid 14, the side frame members 30, and the header 32 define a roof opening 31.

Referring to FIGS. 2 and 3, a split rail assembly, generally shown at 33, includes a fixed rail 34 fixedly secured to each side frame member 30. The fixed rail 34 extends rearwardly from the header 32 along a portion of each side frame member 30. Each fixed rail 34 includes a front end 36 disposed adjacent the header 32, and an opposing back end 38.

The split rail assembly 33 also includes a movable rail 40 extending forwardly from the rear decklid 14 along a remaining portion of each side frame member 30. Each movable rail 40 includes a front end 42 and an opposing back end 44. The front end 42 of the movable rail 40 abuts the back end 38 of the fixed rail 34 such that the split rail assembly 33 is continuous as its extends longitudinally between the front windshield 12 and the rear decklid 14.

Referring to FIG. 4, each fixed rail 34 includes an outwardly extending mounting flange 42 that is adapted to be fixedly secured to the adjacent side frame member 30. The fixed rail 34 is generally U-shaped and defines an interior portion, generally shown at 45. The interior portion 45 includes longitudinally extending first 46 and second 48 cable channels. The interior portion 45 also includes longitudinally extending upper 50 and lower 52 recesses. Although the fixed rail 34 is shown in FIG. 4, it should be appreciated that the movable rail 40 has a similar cross-section to the fixed rail 34. In particular, each movable rail 40 includes the longitudinally extending first 46 and second 48 cable channels, and the longitudinally extending upper 50 and lower 52 recesses. More specifically, the first 46 and second 48 cable channels, and the upper 50 and lower 52 recesses extend continuously from the front end 36 of the fixed rail 34 to the back end 44 of the movable rail 40.

A rail bracket or scissor insert 37 defining a retention slot 39 is fixedly secured to the fixed rail 34 adjacent the front end 36 thereof, as shown in FIG. 3. More specifically, the rail bracket 37 is disposed within the interior portion 45 of each fixed rail 34. The rail bracket 37 is preferably formed from a metal material.

In the preferred embodiment, the fixed 34 and movable 40 rails are each formed from an extruded aluminum. It is, however, appreciated that the fixed 34 and movable 40 rails may be formed from any of numerous materials.

Figure 5:
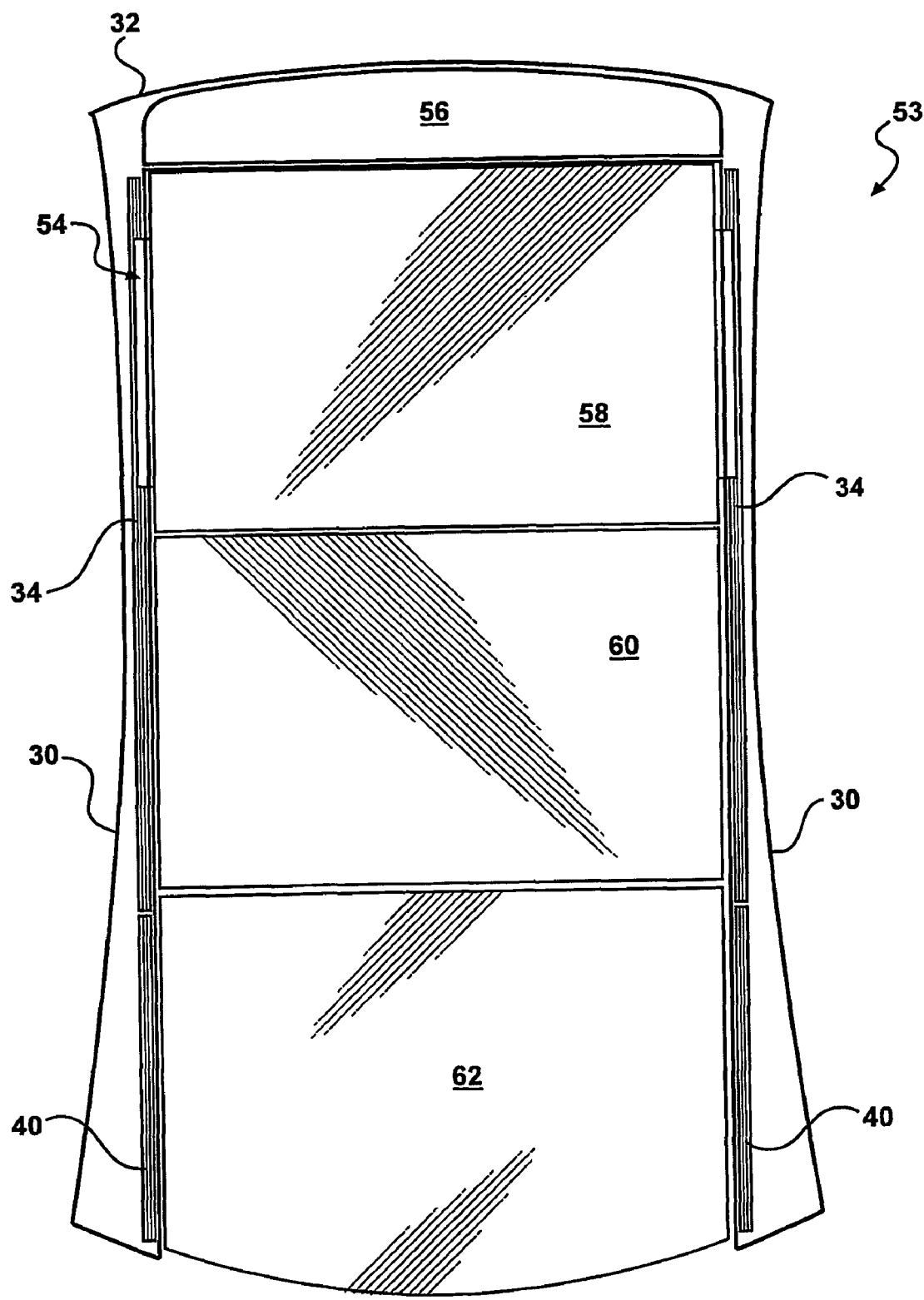
FIG. 5 is a top view of the retractable roof in a closed position.
Figure 6:
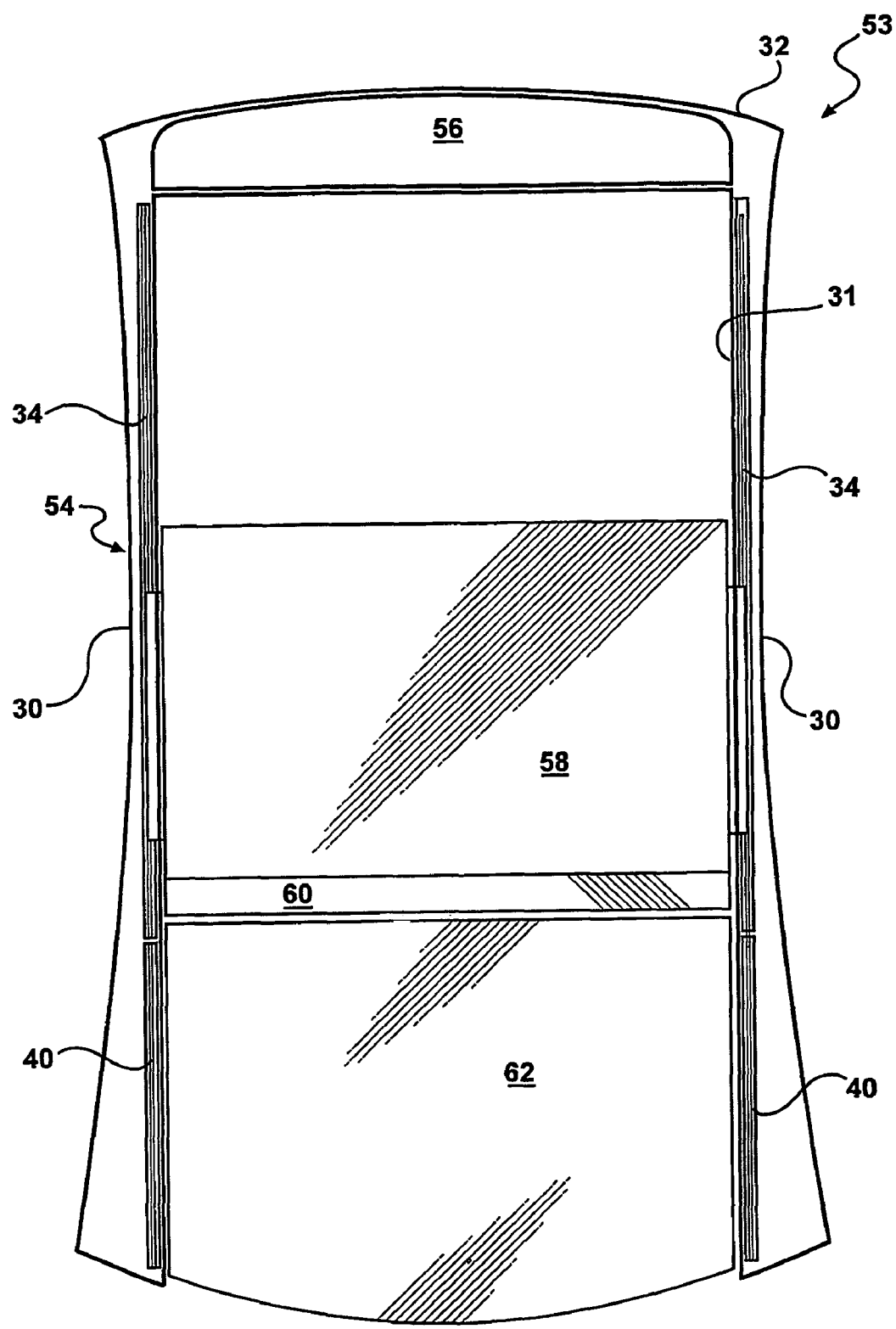
FIG. 6 is a top view of the retractable roof in a partially open position.
Figure 7:
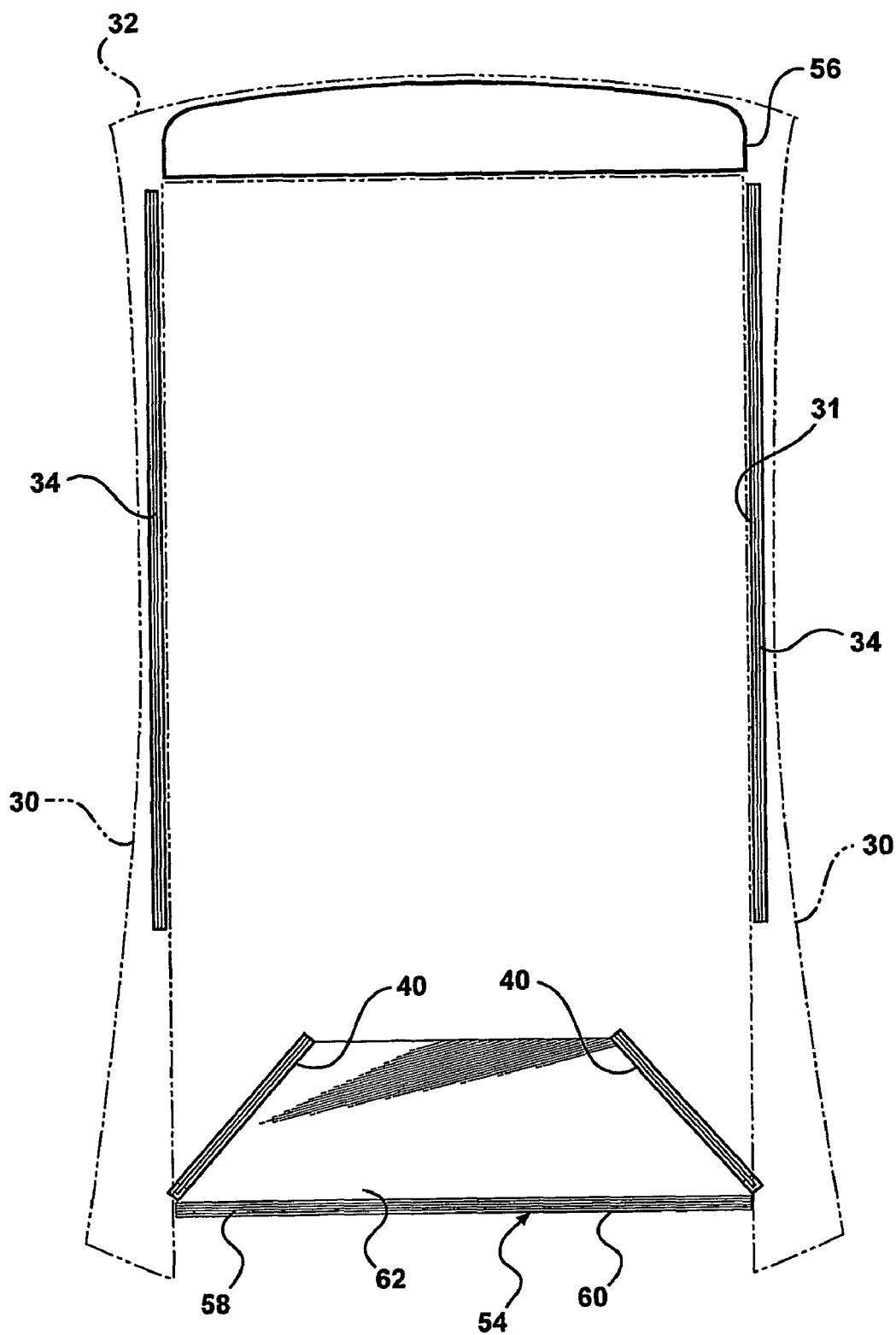
FIG. 7 is a top view of the retractable roof in a fully open position.

Referring to FIG. 5, a retractable roof assembly 53 includes a retractable roof or top, generally indicated at 54, extending longitudinally between the header 32 and the rear decklid 14, and laterally between the side frame members 30 to selectively close the roof opening 31. The roof 54 includes a first roof panel 58, a second roof panel 60, and a third roof panel 62, and is movable between a closed position, shown in FIG. 5, a partially open or sunroof position, shown in FIG. 6, and a fully open position, shown in FIG. 7. In addition, an air deflector 56 is pivotally secured to the header 32, as shown in FIGS. 5 through 7.

Figure 8:
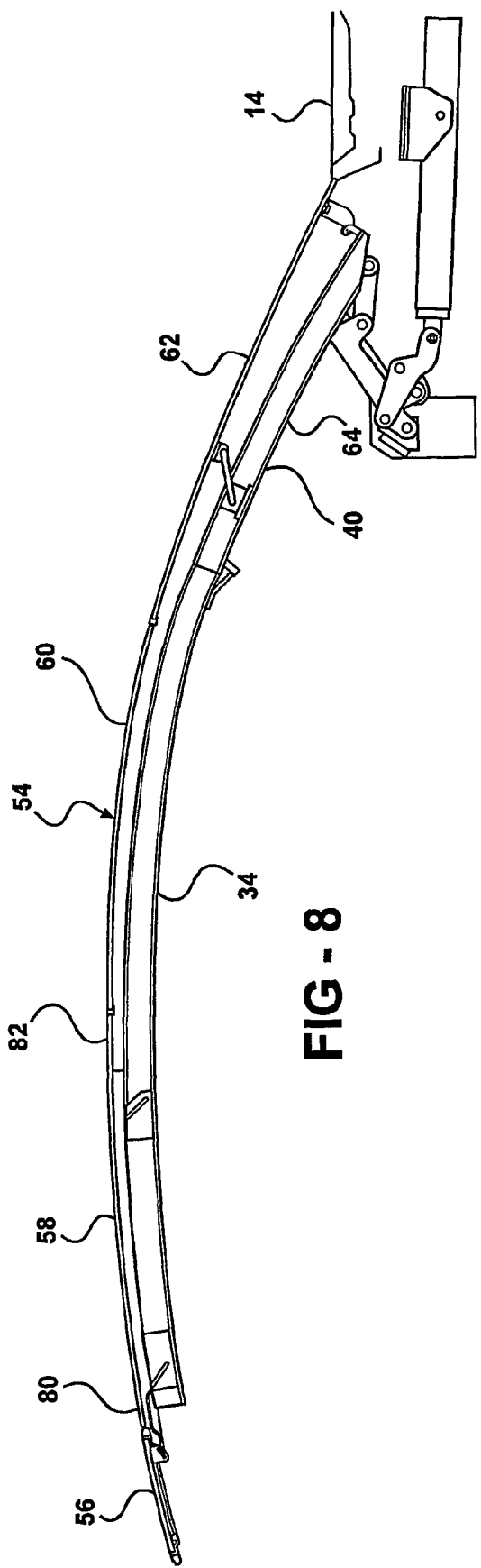
FIG. 8 is a side view of the retractable roof in the closed position.
Figure 35:
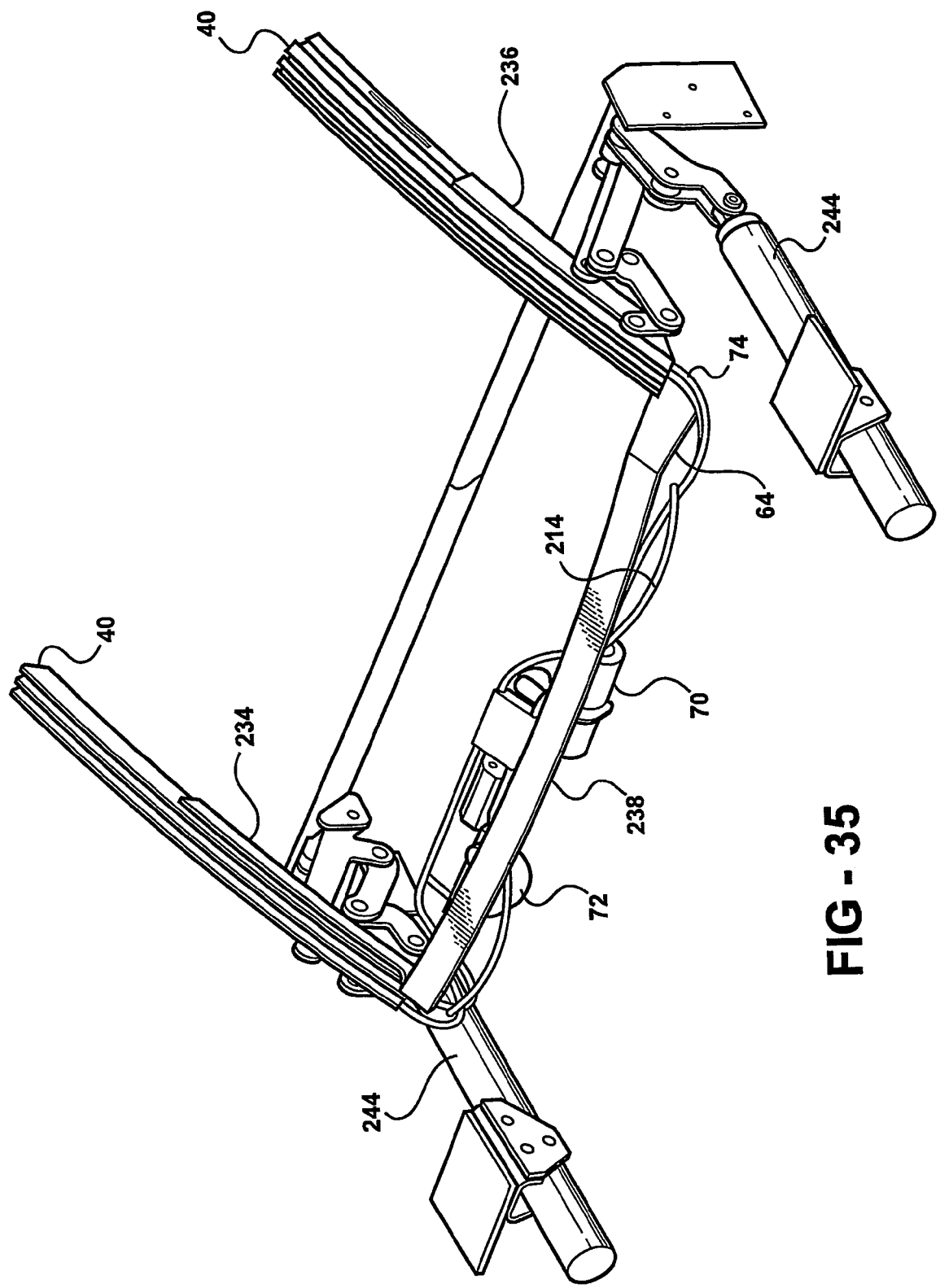
FIG. 35 is a perspective view of the panel support structure and first and second motors fixedly secured thereto.

Referring to FIG. 8, a panel support structure, generally indicated at 64, supports the movable rail 40. First 70 and second 72 motors are fixedly secured to the panel support structure 64, as is shown in FIG. 35. The first motor 70 is operably connected to the first panel 58 via a first cable 74. A full description of the operation of the first motor 70 and cable 74 is disclosed in commonly-owned U.S. Provisional Patent Application Ser. No. 60/499,361, filed Sep. 3, 2003 and entitled "Sunroof", the specification of which is hereby incorporated herein by reference.

The first panel 58 includes a front end 80 and an opposing rear end 82. When the roof 54 is in the closed position, as shown in FIG. 8, the front end 80 of the first panel 58 is disposed adjacent the air deflector 56. More specifically, the front end 80 of the first panel 58 presses the air deflector 56 downwards when the roof 54 is in the closed position.

Figure 9:
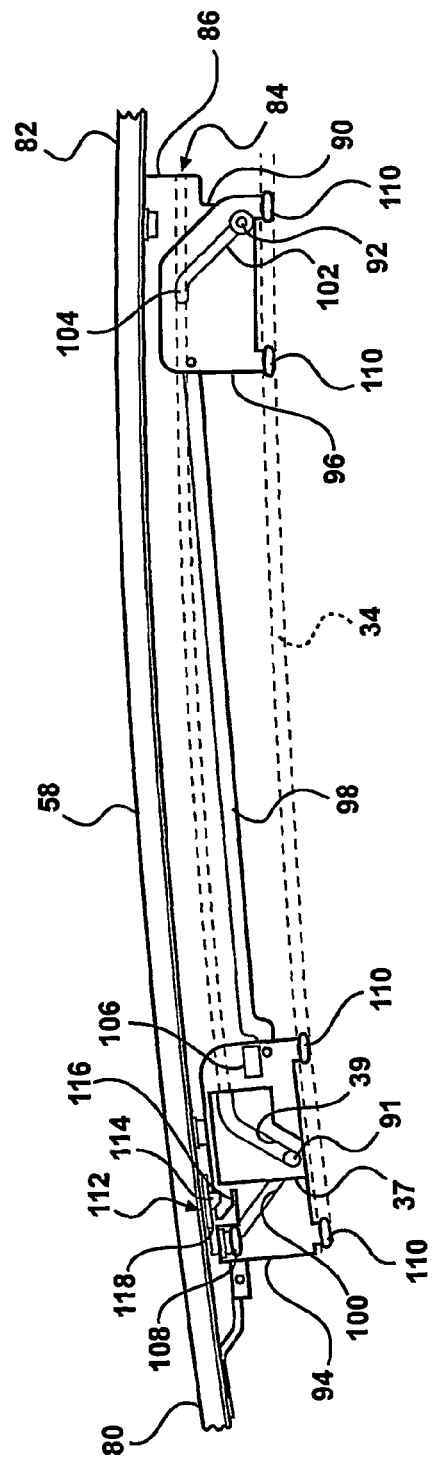
FIG. 9 is a side view of a first panel of the retractable roof and a carrier assembly.

Referring to FIGS. 9 through 11, a carrier assembly, generally indicated at 84, is coupled to the first panel 58, and assists in raising the first panel 58 relative to the fixed rail 34. The carrier assembly 84 includes a panel carrier 86 that is bolted or otherwise fixedly secured to the first panel 58. The panel carrier 86 includes front 88 and rear 90 legs, shown in FIG. 10, having respective pins 91, 92 extending out therefrom.

The carrier assembly 84 also includes front 94 and rear 96 guides, shown in FIGS. 9 and 11, coupled to the panel carrier 86. The front 94 and rear 96 guides are connected to one another by a connecting bar 98. Each of the front 94 and rear 96 guides defines an elongated slot 100 for receiving the sliding pins 91, 92 of the respective front 88 and rear 90 legs of the panel carrier 86. Each elongated slot 100 extends between a lower end 102 and an upper end 104. The sliding pin 91 of the front leg 88 is also selectively received within the retention slot 39 of the rail bracket 37. The movement of each of the sliding pins 91, 92 from the lower end 102 of the elongated slot 100 to the upper end 104 thereof raises the panel carrier 86, and with it the first panel 58, relative to the front 94 and rear 96 guides, as shown in FIG. 11.

The front guide 94 also includes an outwardly extending mounting arm 106, shown in FIGS. 9 and 11, which is fixedly secured to the first cable 74. Activation of the first motor 70 drives the first cable 74 rearwardly, which causes the pin 91 on the front leg 88 to exit the retention slot 39 of the rail bracket 37 and move to the upper end 104 of the elongated slot 100 in the front guide 94. Simultaneously, the pin 92 on the rear leg 90 moves to the upper end 104 of the elongated slot 100 in the rear guide 96. As a result, the panel carrier 86 and the first panel 58 coupled thereto are raised relative to the front 94 and rear 96 guides. After the initial raising of the first panel 58, the driven first cable 74 urges the front 94 and rear 96 guides into further rearward movement along the fixed rail 34 in order to move the first panel 58 towards the second panel 60.

Figure 19:
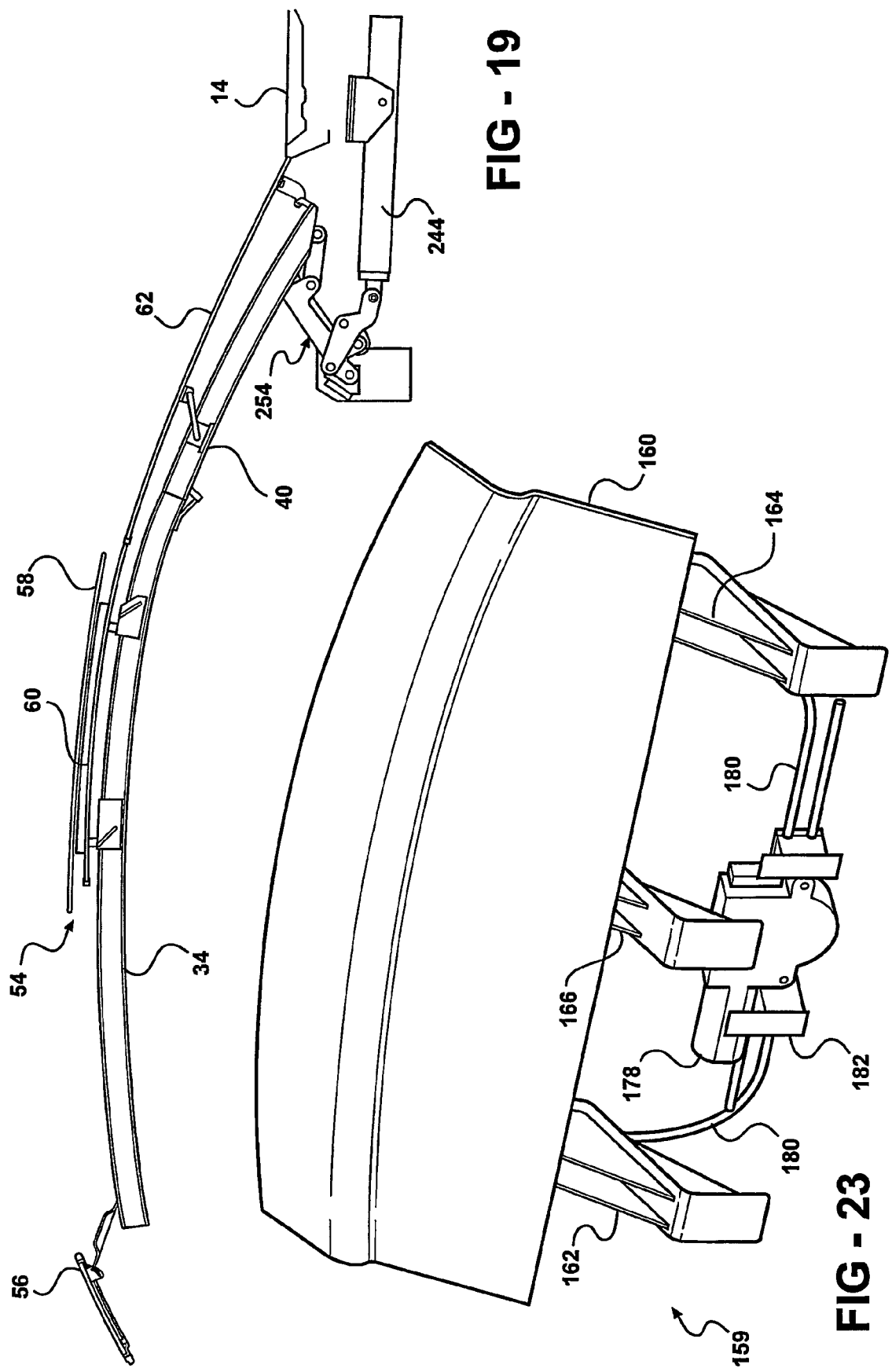
FIG. 19 is a side view of the retractable roof in the partially open position.

When the first panel 58 covers the second panel 60, as shown in FIG. 19, the roof 54 is in the sunroof position. Therefore, a portion of the roof opening 31 is able to receive ventilation and/or sunlight therethrough. Depending on the preference of the occupant, the roof 54 may either be maintained in the partially open position or moved to the fully open position.

Still referring to FIGS. 9 and 11, the front guide 94 includes upper feet 108, and the front 94 and rear 96 guides each include lower feet 110. The upper feet 108 are received within the longitudinally extending upper recess 50 of the fixed rail 34, and the lower feet 110 are received within the longitudinally extending lower recess 52 of the fixed rail 34 (the upper 50 and lower 52 recesses are shown in FIG. 4). Thus, the front 94 and rear 96 guides are disposed within the interior portion 45 of the fixed rail 34. Together, the upper 108 and lower 110 feet allow for smooth, sliding movement of the carrier assembly 84, and with it, the first panel 58, back and forth along the split rail assembly 33.

The front guide 94 further includes a catch, generally indicated at 112, as shown in FIG. 9. The catch 112 includes a striking surface 114, and a receiving slot 116 having a distal end 118, as described in further detail below.

Referring to FIGS. 12 through 14, the air deflector 56 includes a forward end 120 pivotally coupled to the header 32 about a pair of spaced apart hinges 121 (one shown), and an opposing rearward end 122. The air deflector 56 also includes deflector bracket 124 disposed adjacent the rearward end 122. The deflector bracket 124 includes a slot 126 extending between upper 128 and lower 130 ends. The air deflector 56 may be formed from any of numerous materials including, but not limited to, glass, metal, and plastic.

A pivot arm 132 includes a first end 134 pivotally secured to the fixed rail 34, and a second end 136 received within the slot 126. A spring 138 is disposed below the pivot arm 132 adjacent the first end 134 thereof, as shown in FIG. 12. The spring 138 biases the first end 134 of the pivot arm 132 upwards. When the roof 54 is in the closed position, the front end 80 of the first panel 58 presses the first end 134 of the pivot arm 132 downwards against the biasing force of the spring 138 to hold the air deflector 56 in a lowered position, as shown in FIG. 13. When the first panel 58 is, however, raised and moved rearwards along the fixed rail 34, the spring 138 is freed and biases the first end 134 of the pivot arm 132 upwards. As a result, the second end 136 of the pivot arm 132 moves to the upper end 128 of the slot 126. At the same time, the forward end 120 of the air deflector 56 pivots relative to the header 32 about the spaced apart hinges 121 so that the air deflector 56 moves to an elevated position, as shown in FIG. 14. In the elevated position, the air deflector 56 prevents or reduces air turbulence from entering the passenger compartment 20 below.

Referring to FIG. 15, the second panel 60 includes a lower surface 140 extending between front 142 and rear 144 ends. A coupling mechanism, generally indicated at 146, is fixedly secured to the lower surface 140 adjacent the front end 142 of the second panel 60. The coupling mechanism 146 includes upper feet 148 disposed within the longitudinally extending upper recess 50 of the fixed rail 34. Thus, the upper feet 148 of the second panel 60, and the upper feet 108 of the first panel 58 are disposed within the same space, that is, the longitudinally extending upper recess 50 of the fixed rail 34.

Figure 16:
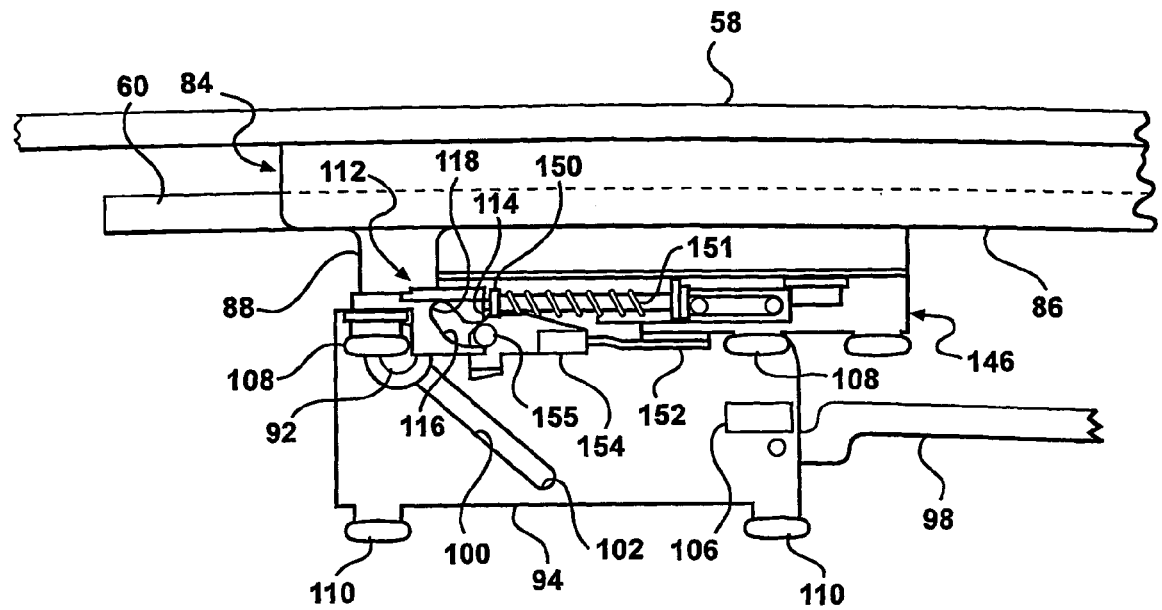
FIG. 16 is a side view of a catch of the first panel approaching the coupling mechanism of the second panel.
Figure 17:
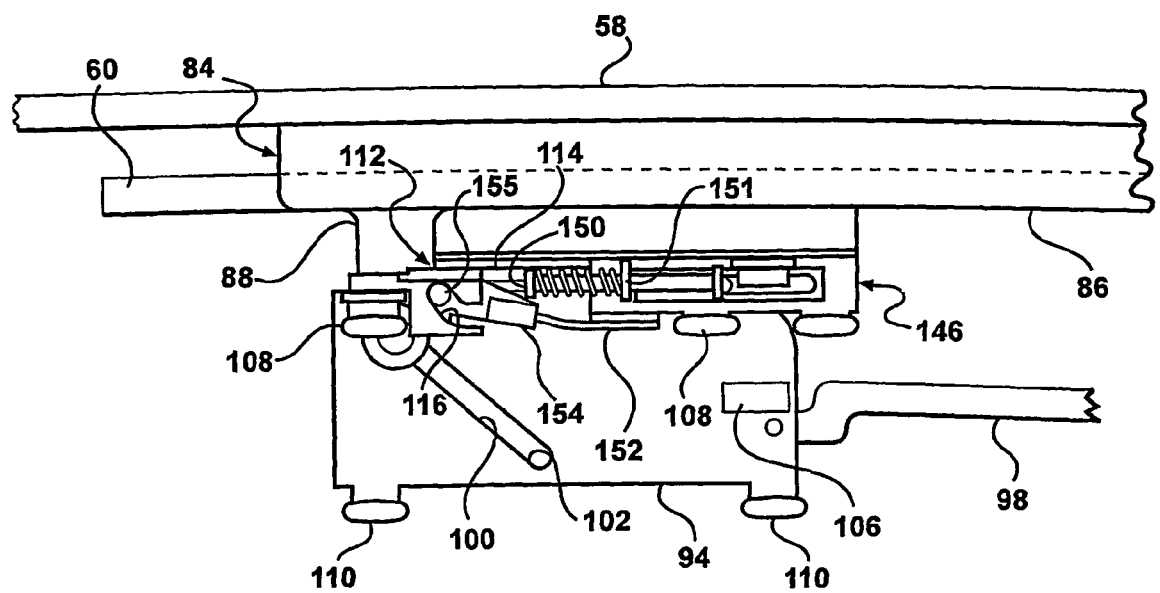
FIG. 17 is a side view of the catch engaging the coupling mechanism to couple the first panel to the second panel.

Referring to FIGS. 16 and 17, the coupling mechanism 146 also includes a plunger 150, which selectively releases a leaf spring 152. The coupling mechanism 146 further includes a locking member 154 including a pin 155. As the first panel 58 moves over the second panel 60, the striking surface 114 of the catch 112 contacts the plunger 150 to force movement thereof in the direction of arrow A in FIG. 16. The plunger 150 compresses a spring 151. As a result, the leaf spring 152 is released to allow upwards rotation of the locking member 154. At the same time that the striking surface 114 contacts the plunger 150, the receiving slot 116 of the catch 112 picks up the pin 155. The pin 155 is urged to the distal end 118 of the receiving slot 116 by the continued movement of the first panel 58 over the second panel 60. Thus, when the pin 155 is at the distal end 118 of the receiving slot 116, a portion of the locking member 154 is disposed within the receiving slot 116 to prevent the pin 155 from being released, as shown in FIG. 17. As a result, the first 58 and second 60 panels are coupled to one another. The coupling of the first 58 and second 60 panels occurs after the roof 54 has moved out of the sunroof position towards the fully open position. In other words, when the roof 54 is in the sunroof position, the first 58 and second 60 panels are not coupled to one another by the catch 112 and coupling mechanism 146.

It is appreciated that although the catch 112 and the coupling mechanism 146 have been specifically described for coupling the first 58 and second 60 panels, the coupling of the first 58 and second 60 panels can be accomplished in any of numerous ways.

Figure 18:
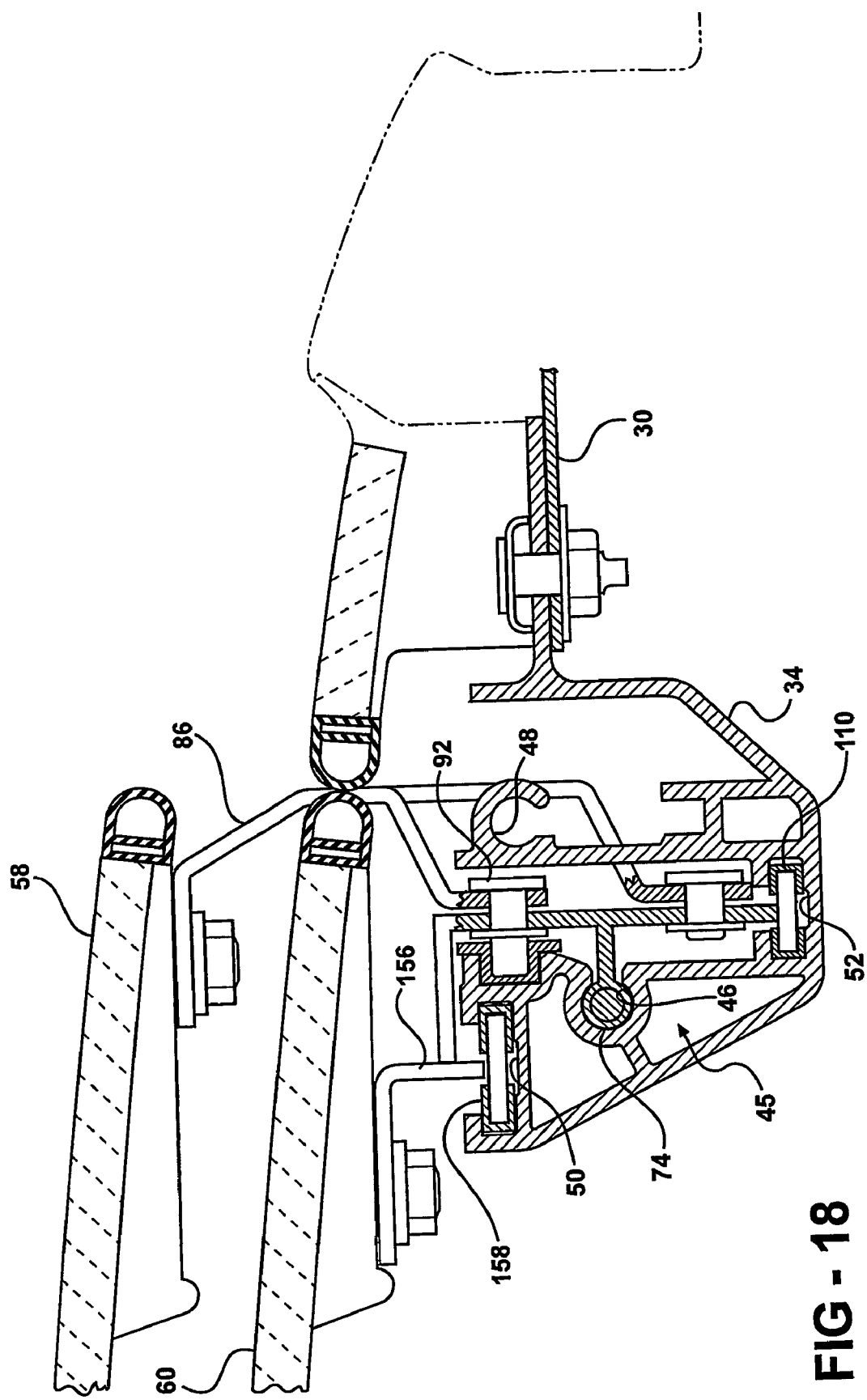
FIG. 18 is a cross-sectional view of the carrier assembly disposed within an interior portion of the fixed rail.

Referring back to FIG. 15, a guide 156 is fixedly mounted to the lower surface 140 of the second panel 60 adjacent the rear end 144 thereof. The guide 156 includes upper feet 158 disposed within the longitudinally extending upper recess 50 of the fixed rail 34, as shown in FIG. 18. The guide 156 stabilizes the rear end 144 of the second panel 60 as the second panel 60 moves along the split rail assembly 33.

Referring to FIGS. 20 through 24, a package tray assembly, generally shown at 159, includes a package tray 160. The package tray 160 is movable between a generally horizontal use position, shown in FIGS. 20 and 21, in which the package tray 160 covers at least a portion of the receptacle 28, and a folded position, shown in FIGS. 23 and 24, in which the package tray 160 is tilted forward and downward to uncover the receptacle 28.

The package tray 160 is coupled to a pair of spaced apart, outboard reinforcement brackets 162, 164 and a central reinforcement bracket 166 disposed therebetween. Each of the outboard reinforcement brackets 162, 164 includes an elongated slot 168 having opposing first 170 and second 172 ends. The package tray 160 includes a pair of outboard guides 174 each terminating in a sliding pin 176. Each sliding pin 176 is received within the elongated slot 168 of one of the outboard reinforcement brackets 162, 164 to couple the package tray 160 thereto. Each outboard guide 174 is operably connected to a third motor 178 via a cable 180. The third motor 178 is fixedly mounted to the rear seat 24 or a rear seat support structure (not shown) behind the rear seat 24 by a mounting bracket 182.

Figure 22:
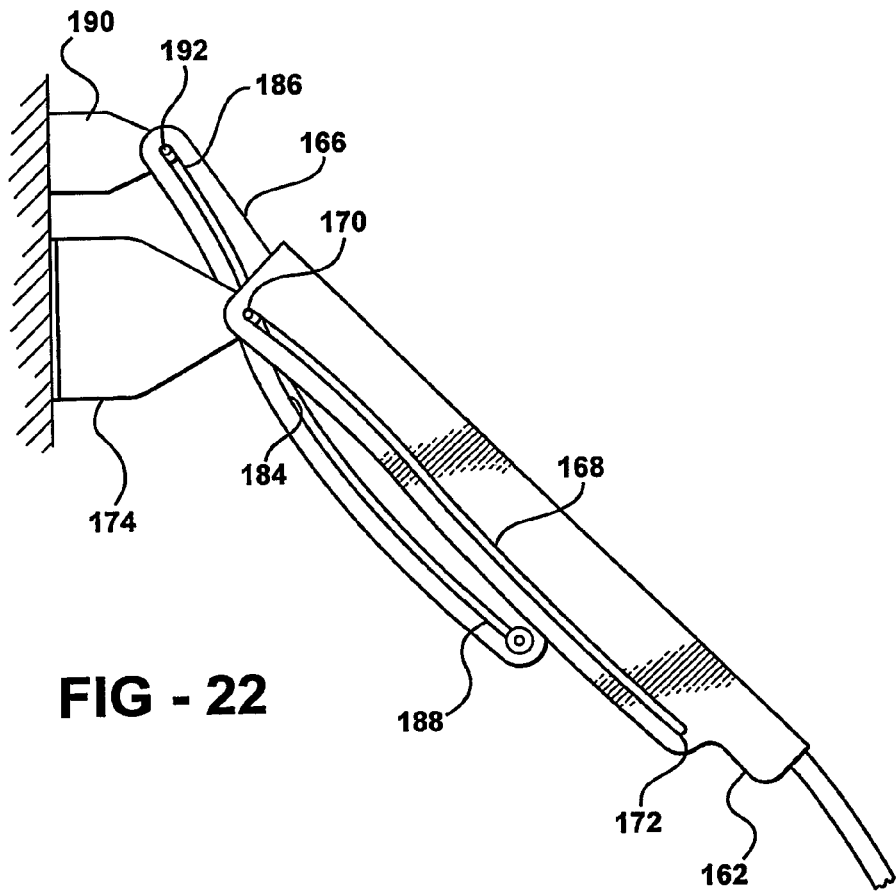
FIG. 22 is a fragmentary, side view of the package tray assembly including a central reinforcement bracket and an outboard bracket.

The central reinforcement bracket 166 defines a generally arc-shaped slot 184 extending between first 186 and second 188 ends, shown in FIG. 22. The package tray 160 includes a central guide 190 terminating in a sliding pin 192, which is received within the arc-shaped slot 184 to couple the package tray 160 to the central reinforcement bracket 166.

Figure 20:
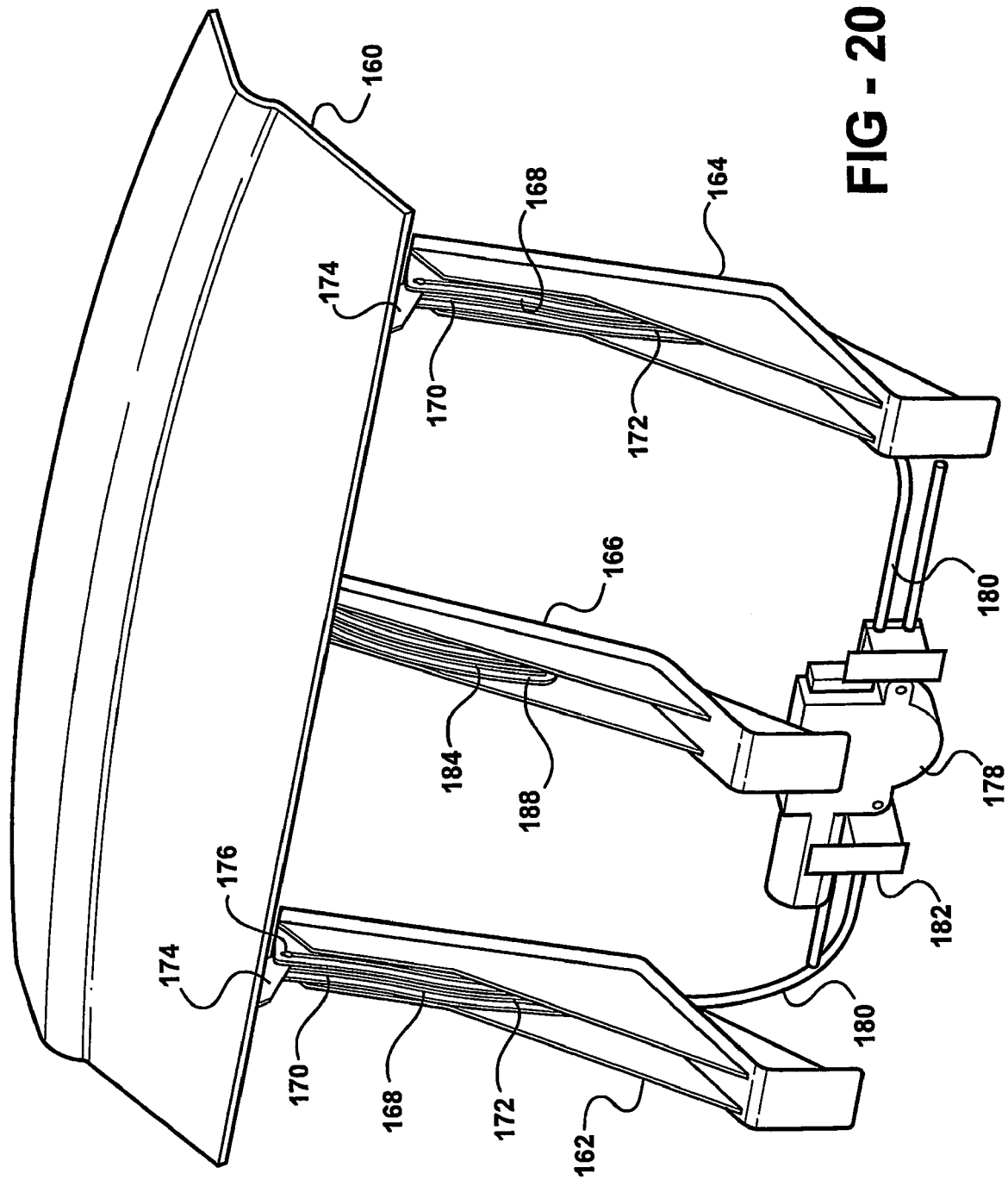
FIG. 20 is a perspective view of a package tray assembly with a package tray in a use position.
Figure 21:
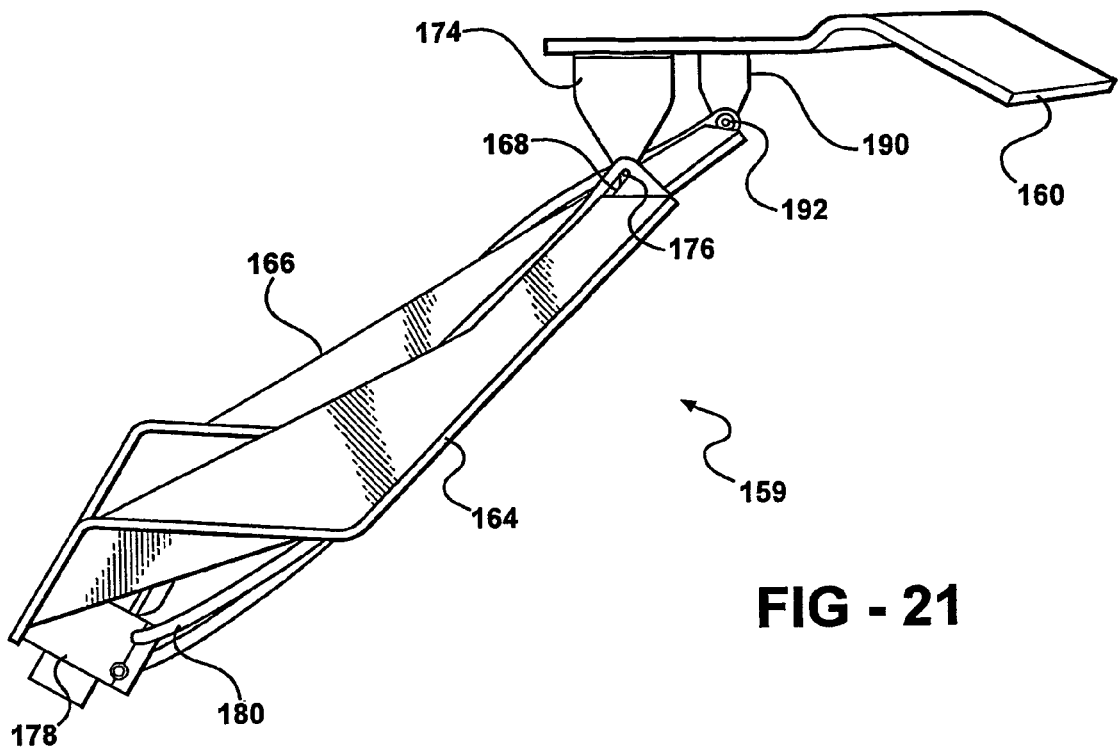
FIG. 21 is a side view of the package tray assembly with the package tray in the use position.
Figure 24:
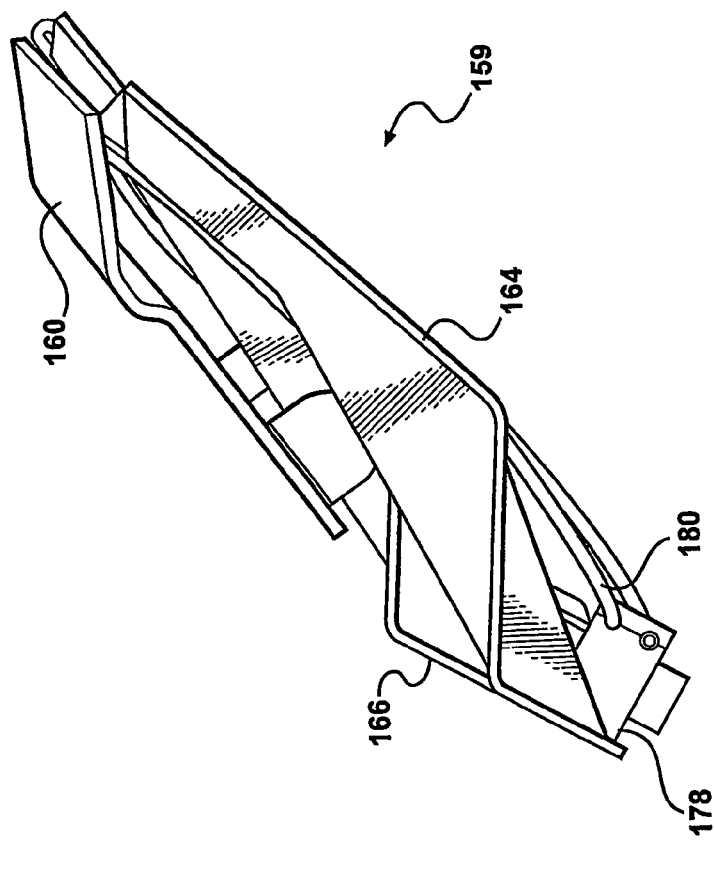
FIG. 24 is a side view of the package tray assembly with the package tray in the folded position.

To move the package tray 160 from the use position, shown in FIGS. 20 and 21, to the folded position, shown in FIGS. 23 and 24, the third motor 178 is activated to drive the cable 180, which urges the sliding pins 176 along each outboard guide 174 into movement towards the second end 172 of each elongated slot 168. The movement of the outboard guides 174 within the elongated slots 168 causes the central guide 190 to move towards the second end 188 of the arc-shaped slot 184. The package tray 160 initially follows the same path as the central guide 190 along the arc-shaped slot 184 for initial pivoting movement. Eventually, the package tray 160 will follow the same path as the outboard guides 174 along the elongated slots 168 in order to reach the folded position. The package tray 160 follows such a path in order to avoid contact with one of the many components surrounding the package tray assembly 159.

Figure 25:
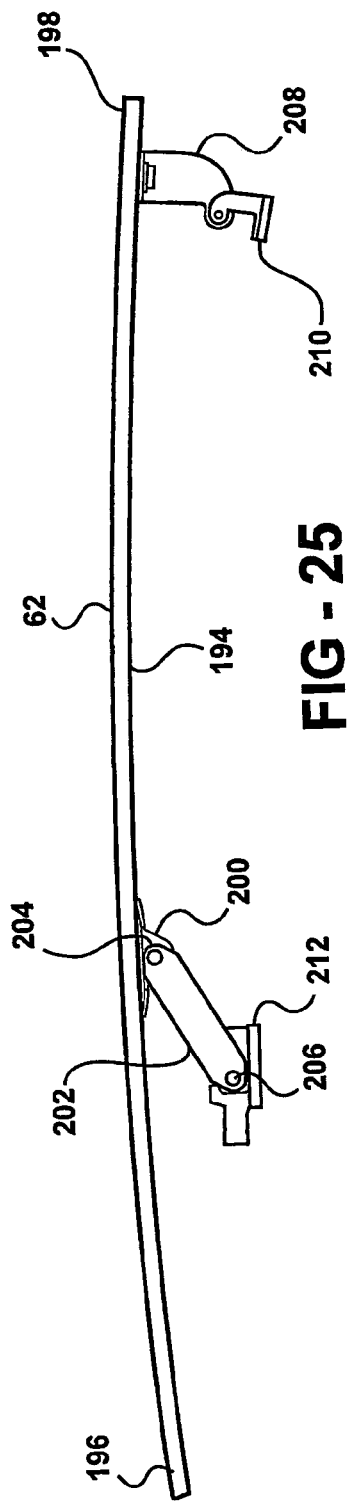
FIG. 25 is a side view of a third panel of the retractable roof.

Referring to FIG. 25, the third panel 62 includes a lower surface 194 extending between a front end 196 and an opposing rear end 198. A pivot mount 200 is fixedly secured to the lower surface 194 of the third panel 62 approximately midway between the front 196 and rear 198 ends thereof. A pivot bar 202 includes a first end 204 pivotally coupled to the pivot mount 200, and an opposing second end 206. In addition, a support bracket 208 is fixedly secured to the lower surface 194 of the third panel 62 at the rear end 198 thereof. The support bracket 208 is pivotally coupled to an arm 210. The arm 210 is coupled to the movable rail 40 at the back end 44 thereof. The support bracket 208 and the arm 210 provide support for the third panel 62 at the rear end 198 thereof.

A slide mechanism 212 is slidably disposed within the interior portion 45 of the movable rail 40, and pivotally secured to the second end 206 of the pivot bar 202. The slide mechanism 212 is operably connected to the second motor 72 via a second cable 214, shown in FIG. 35. The movement of the slide mechanism 212 along the movable rail 40 pivots the pivot bar 202 in order to raise and lower the third panel 62.

Figure 26:
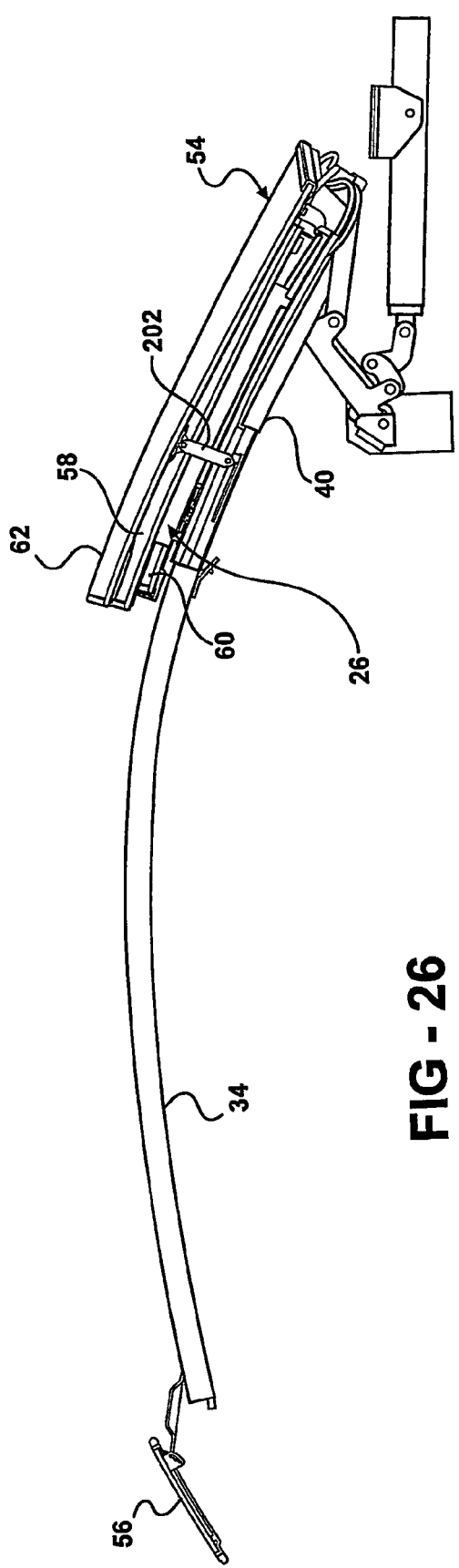
FIG. 26 is a side view of the retractable roof showing the third panel in a raised position.
Figure 27:
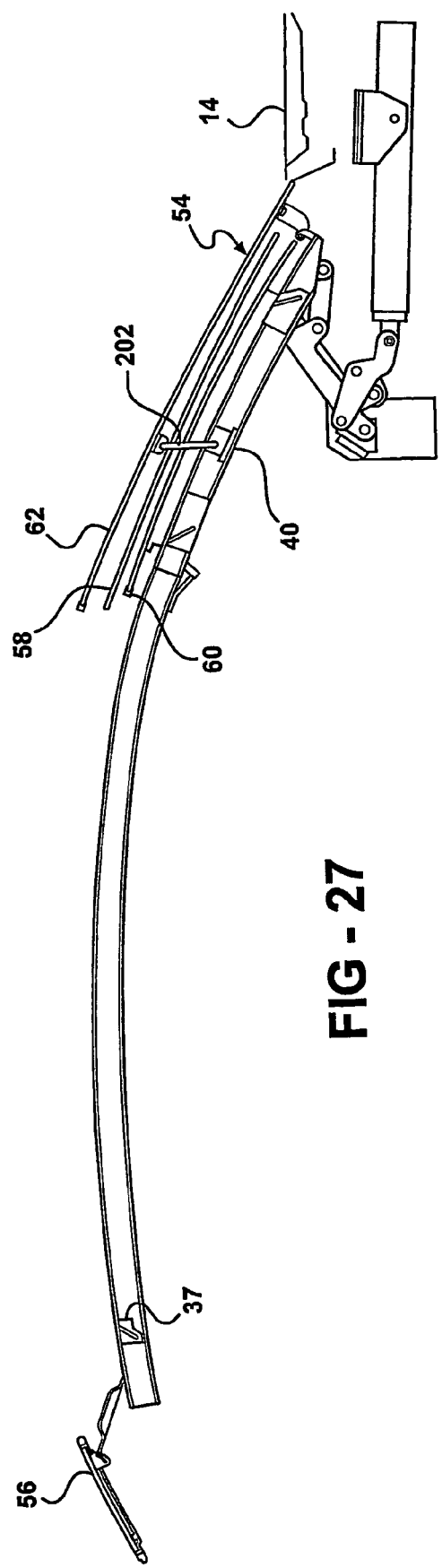
FIG. 27 is a side view of the retractable roof showing the third panel in a lowered position.

The third panel 62 is maintained in a neutral position, shown in FIGS. 8 and 19, when the roof 54 is in either of the closed or sunroof positions. When it is desired to move the roof 54 into the fully open position, the second motor 72 is activated to drive the second cable 214 rearwards. As a result, the slide mechanism 212 moves rearwards towards the rear end 198 of the third panel 62. As the slide mechanism 212 moves rearwards, the pivot bar 202 pivots relative to the movable rail 40 to lift the third panel 62 into a raised position, shown in FIG. 26. Subsequently, the space that is vacated by the raising of the third panel 62 is filled by the first 58 and second 60 panels, which are still being urged rearwards by the first motor 70 and cable 74. After the first 58 and second 60 panels have moved underneath the third panel 62, the second motor 72 urges the slide mechanism 212 rearwards once again, causing the pivot bar 202 to pivot relative to the movable rail 40 and to lower the third panel 62 to a tucked position, shown in FIG. 27. As a result, the first 58, second 60, and third 62 panels are arranged in a generally stacked configuration above the movable rail 40.

Referring to FIGS. 28 through 32, a rail locking mechanism, generally indicated at 220, selectively locks the fixed rail 34 to the movable rail 40. The rail locking mechanism 220 is housed within the movable rail 40, and includes a first 222 and second 224 locking fingers pivotally interconnected by a link 226. The fixed rail 34 includes an opening 228 for selectively receiving the first 222 and second 224 locking fingers. The rail locking mechanism 220 pivots at 225, 227 to allow the first 222 and second 224 locking fingers to bend and/or flex as one or both extend through the opening 228.

Figure 28:
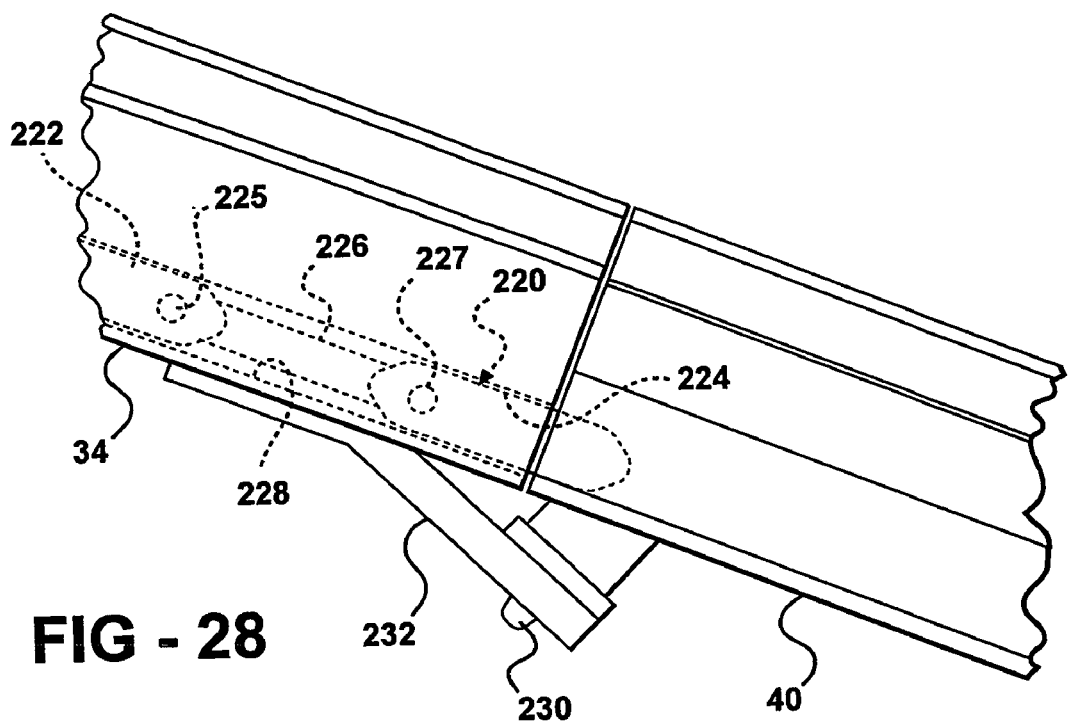
FIG. 28 is a fragmentary, side view of the fixed and movable rails and a rail locking mechanism fully extended.
Figure 29:
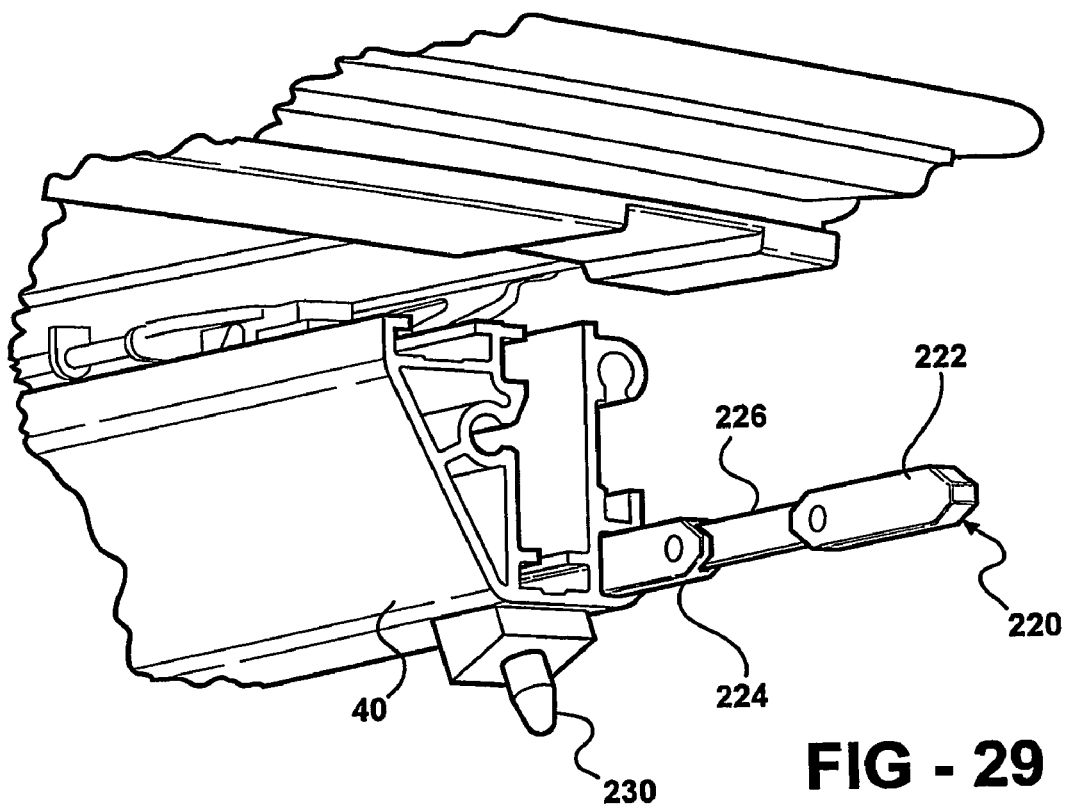
FIG. 29 is a fragmentary, perspective view of the movable rail and the rail locking mechanism fully extended.
Figure 30:
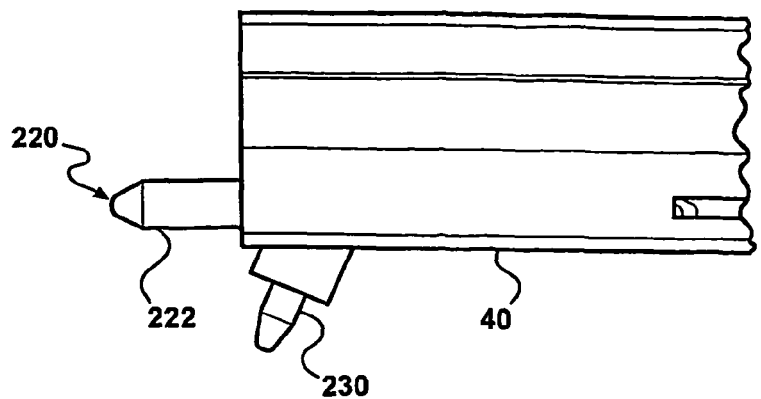
FIG. 30 is a fragmentary, side view of the movable rail with the rail locking mechanism partially extended.
Figure 31:
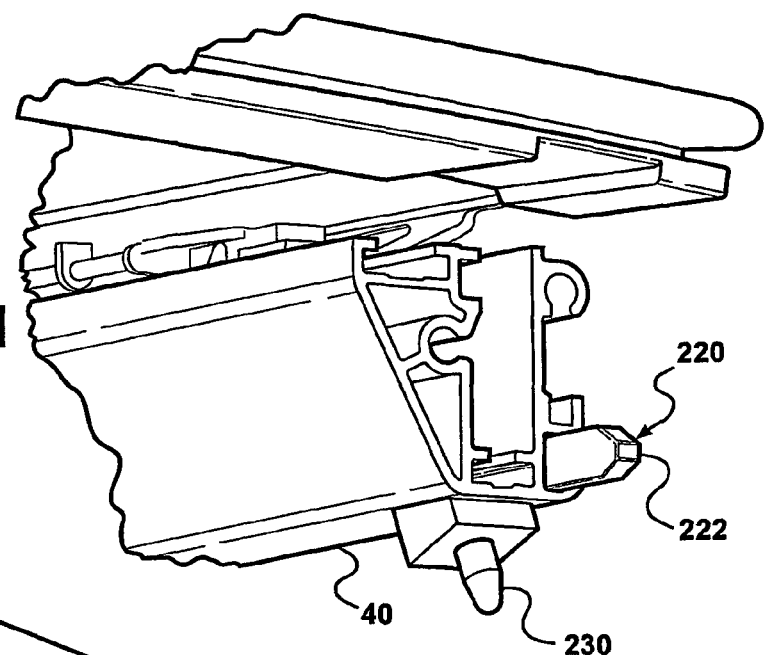
FIG. 31 is a fragmentary, perspective view of the movable rail and the rail locking mechanism partially extended.
Figure 32:
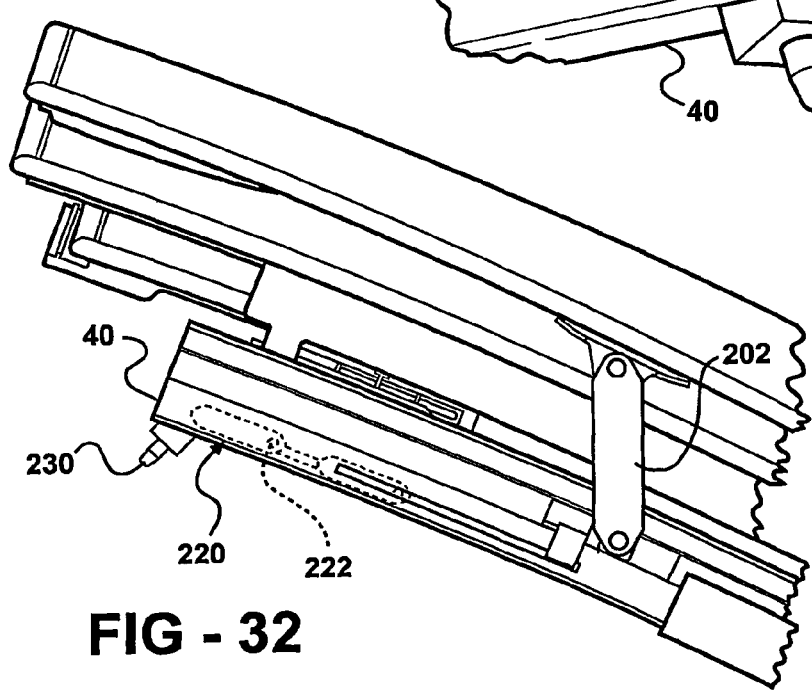
FIG. 32 is a fragmentary, side view of the movable rail with the rail locking mechanism fully retracted for unlocking the movable rail from the fixed rail.

The first 222 and second 224 locking fingers are operably connected to the slide mechanism 212. In other words, the rail locking mechanism 220 locks and unlocks the fixed 34 and movable 40 rails as the slide mechanism 212 moves along the movable rail 40 to pivot the third panel 62 between its neutral, raised, and tucked positions. When the third panel 62 is in its neutral position, as is the case when the roof 54 is closed or opened to the partially open position, the first 222 and second 224 locking fingers each extend into the opening 228, as shown in FIGS. 28 and 29. As a result, the fixed 34 and movable 40 rails are locked to one another. When the third panel 62 is moved to its partially open position, only the first locking finger 222 extends into the opening 228 of the fixed rail 34, as shown in FIGS. 30 and 31. Still, the fixed 34 and movable 40 rails are locked. Finally, when the third panel 62 is moved to its tucked position, the rail locking mechanism 220 is disposed entirely within the movable rail 40, as shown in FIG. 31, thereby unlocking the fixed 34 and movable 40 rails from one another.

Although the rail locking mechanism 220 has been specifically described above for locking the fixed 34 and movable 40 rails to one another, it is appreciated that the fixed 34 and movable 40 rails can be locked to one another in any one of numerous ways.

Referring back to FIG. 28, the movable rail 40 additionally includes an outwardly extending locator pin 230. The fixed rail 34 includes a locking tab 232 having an aperture (not shown) for receiving the locator pin 230 therethrough. The engagement between the locator pin 230 and the locking tab 232 prevents the fixed 34 and movable 40 rails from pulling apart from one another to further lock the fixed 34 and movable 40 rails to one another. The locator pin 230 and locking tab 232 also assist the first locking finger 222 in locating the opening 228 as the movable rail 40 approaches the fixed rail 34, that is, during movement of the roof 54 from the fully open position back to the closed or partially open position.

Although the locator pin 230 and locking tab 232 been specifically described above as an additional locking mechanism for the fixed 34 and movable 40 rails to one another, it is appreciated that the numerous other locking devices may be utilized to effect this additional locking action.

Figure 33:
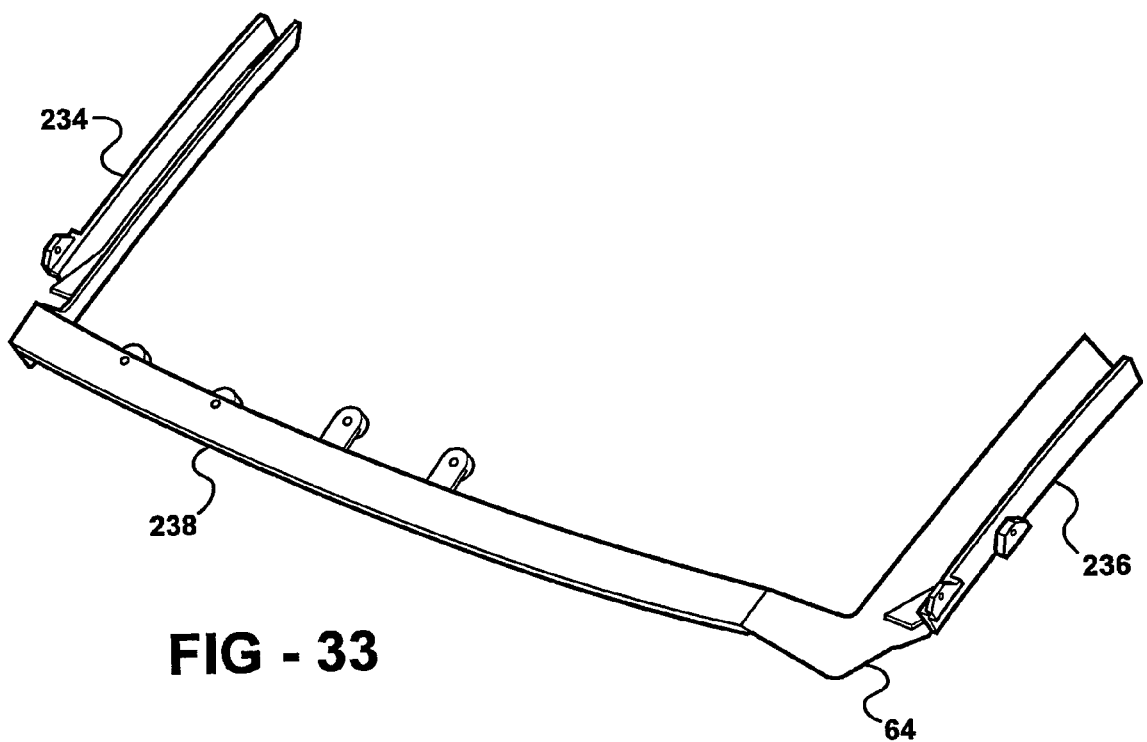
FIG. 33 is a perspective view of a panel support structure.
Figure 34:
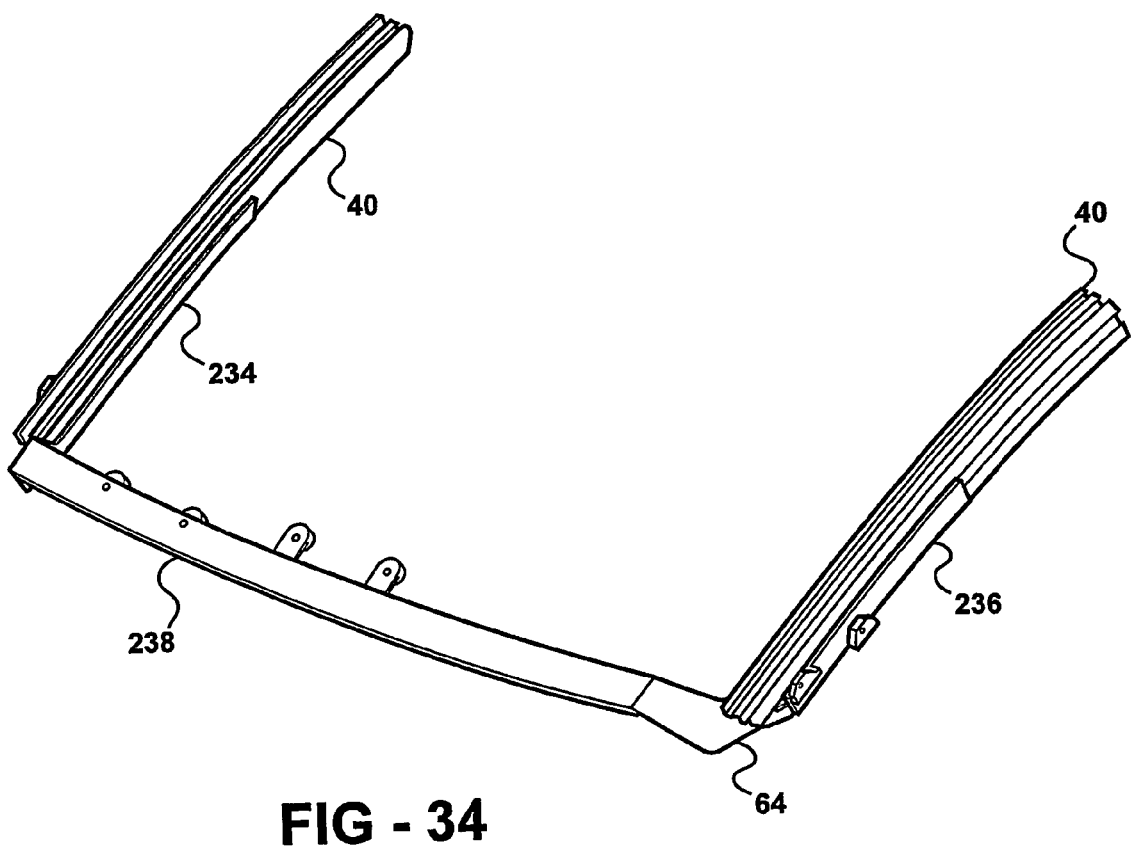
FIG. 34 is a perspective view of the panel support structure and the movable rail fixedly secured thereto.

The panel support structure 64, previously introduced above, supports the first 58, second 60, and third 62 panels when they are arranged in the generally stacked configuration. Referring to FIGS. 33 and 34, the generally U-shaped panel support structure 64 includes spaced apart side support members 234, 236 and a cross member 238 extending therebetween. Each of the side support members 234, 236 is configured to receive one of the movable rails 40 therewithin. The movable rails 40 are bolted and/or otherwise fixedly secured to the side support members 234, 236. In addition, the first 70 and second 72 motors are each fixedly secured to the cross member 238 of the panel support structure 64, as shown in FIG. 35. In the preferred embodiment, the panel support structure 64 is formed from magnesium, or a material having similar strength characteristics, in order to support the movable rail 40 and the panels 58, 60, 62 during movement of the roof 54 into and out of the fully open position.

Figure 36:
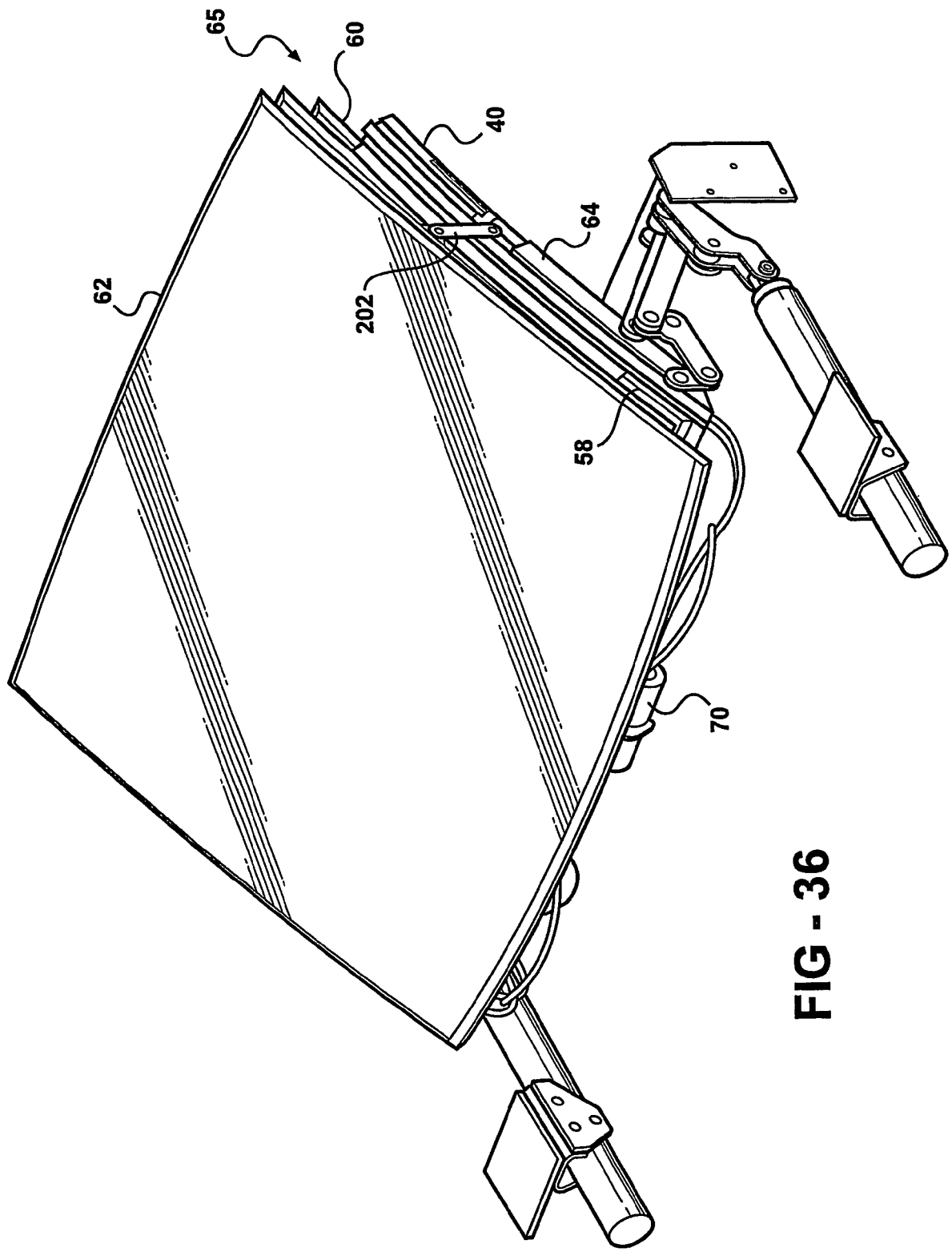
FIG. 36 is a perspective view of a stowable cartridge including the panel support structure, the movable rail, and the first, second, and third panels.
Figure 37:
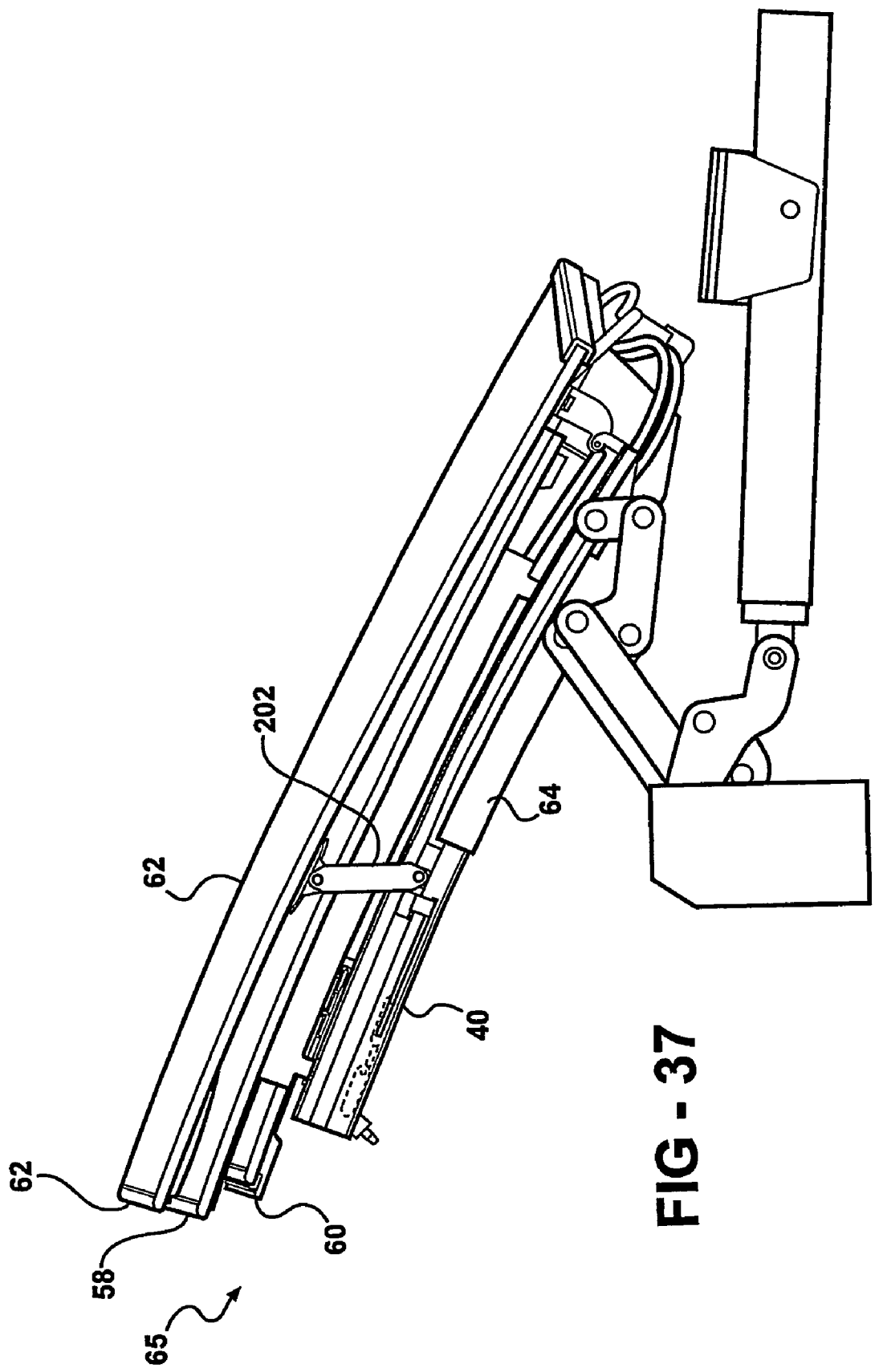
FIG. 37 is a side view of the cartridge and a linkage assembly operably connected thereto.

When the movable rail 40 is unlocked from the fixed rail 34, the panel support structure 64, the first 70 and second 72 motors, the first 74 and second 214 cables, the movable rail 40, the carrier assembly 84, and the panels 58, 60, 62 form a stowable cartridge, generally shown at 65 in FIGS. 36 and 37.

Figure 38:
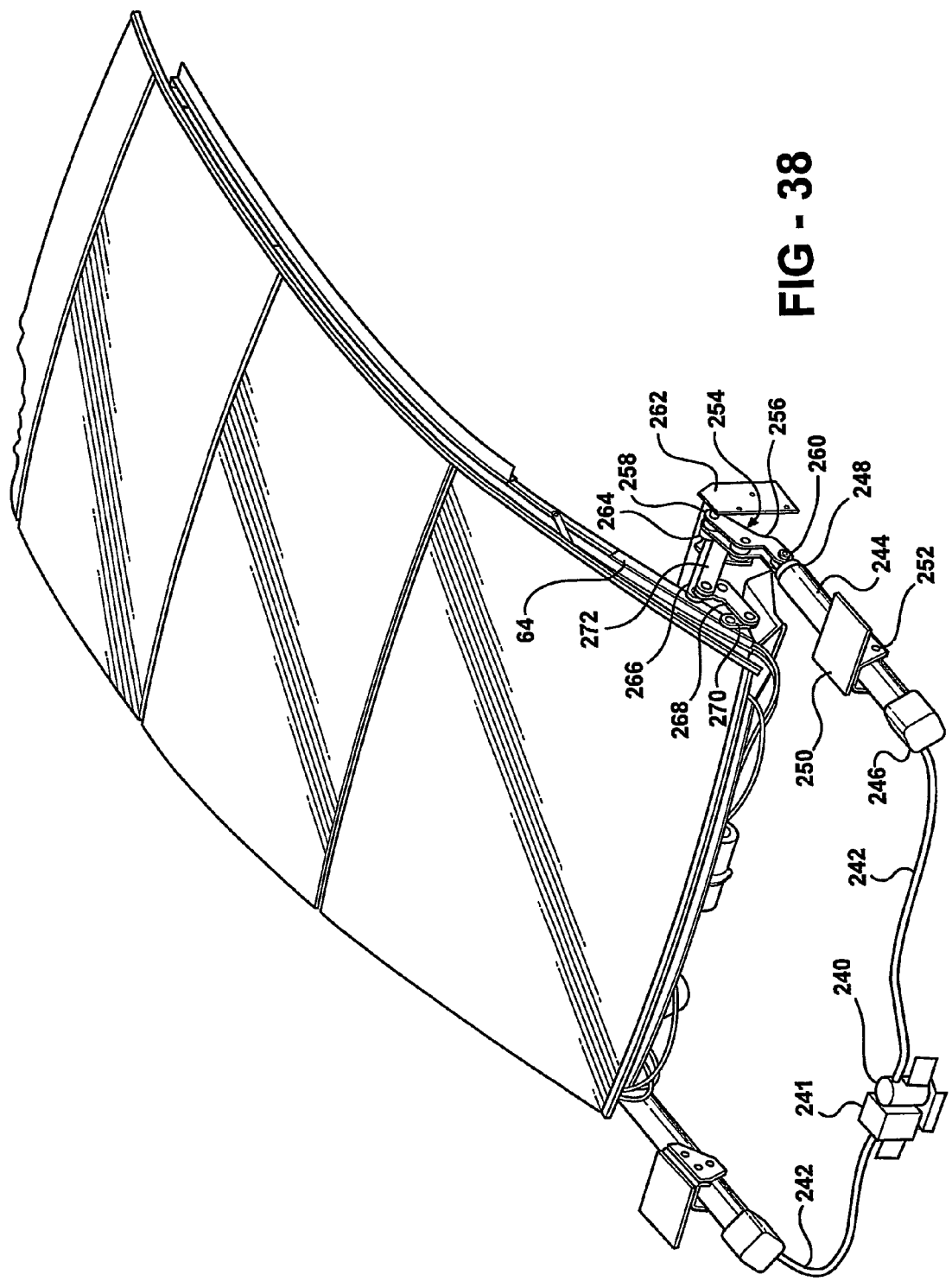
FIG. 38 is a rear perspective view of the linkage assembly and a motor operably connected thereto.
Figure 39:
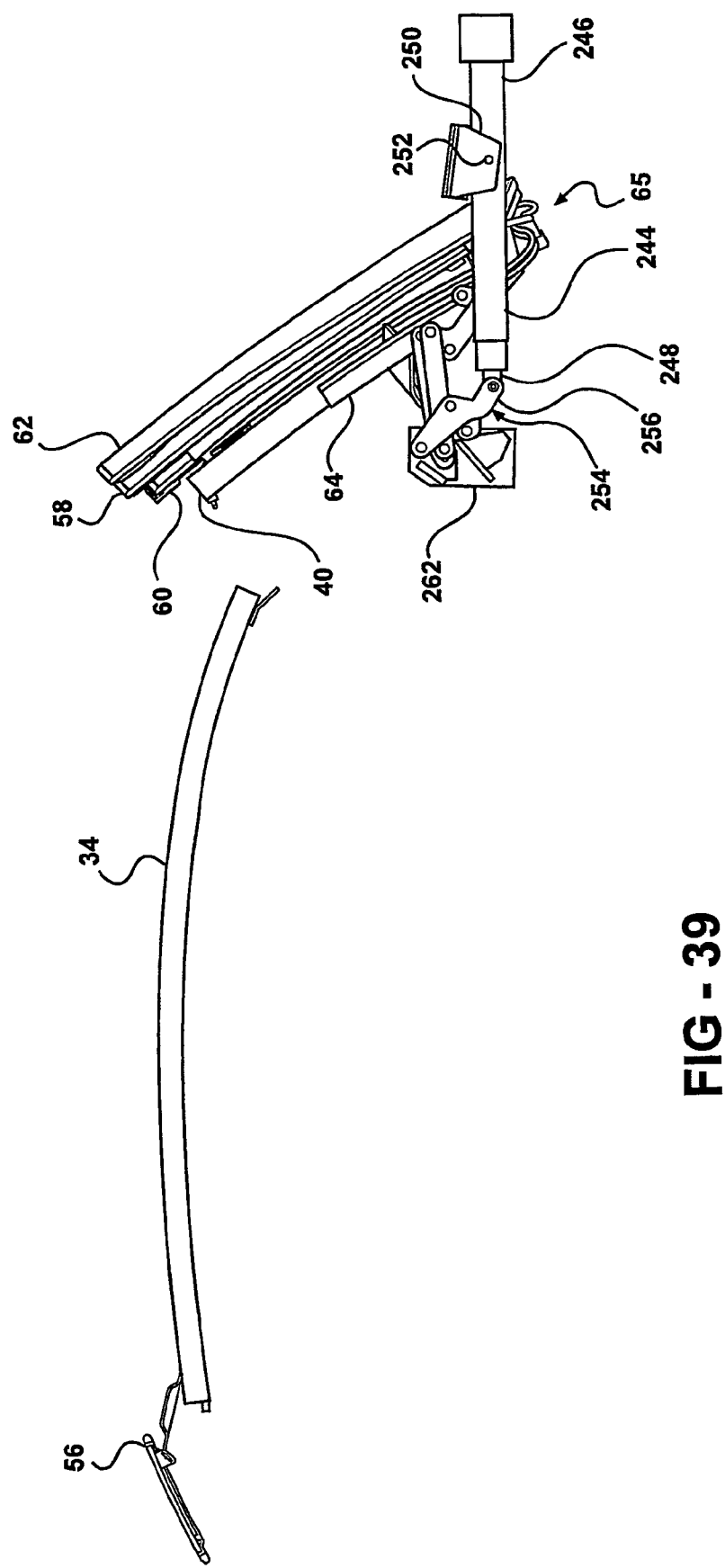
FIG. 39 is a side, perspective view of the linkage assembly pivoting the cartridge relative to the fixed rail.
Figure 40:
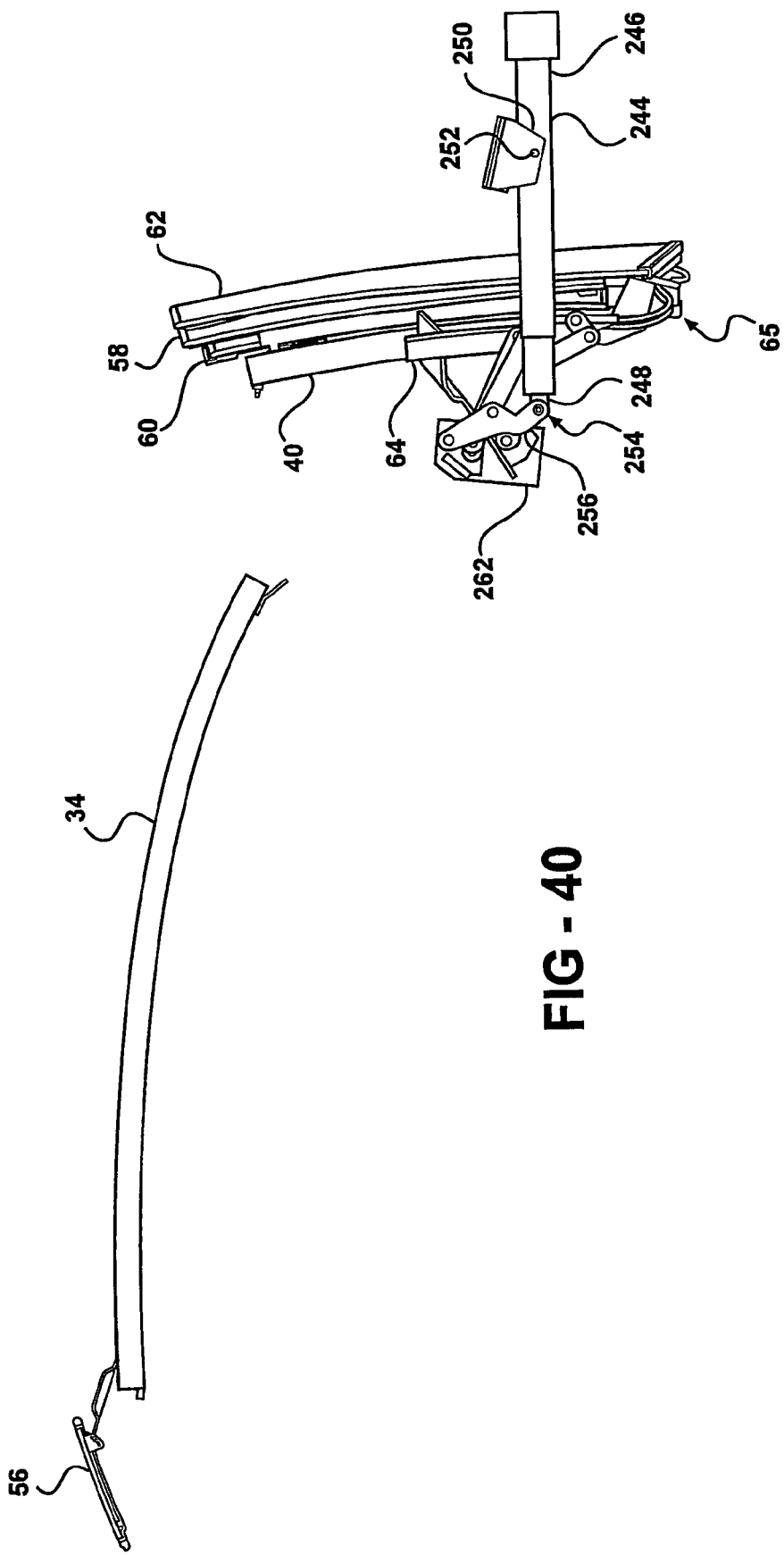
FIG. 40 is a side, perspective view showing the cartridge being articulated by the linkage assembly.
Figure 41:
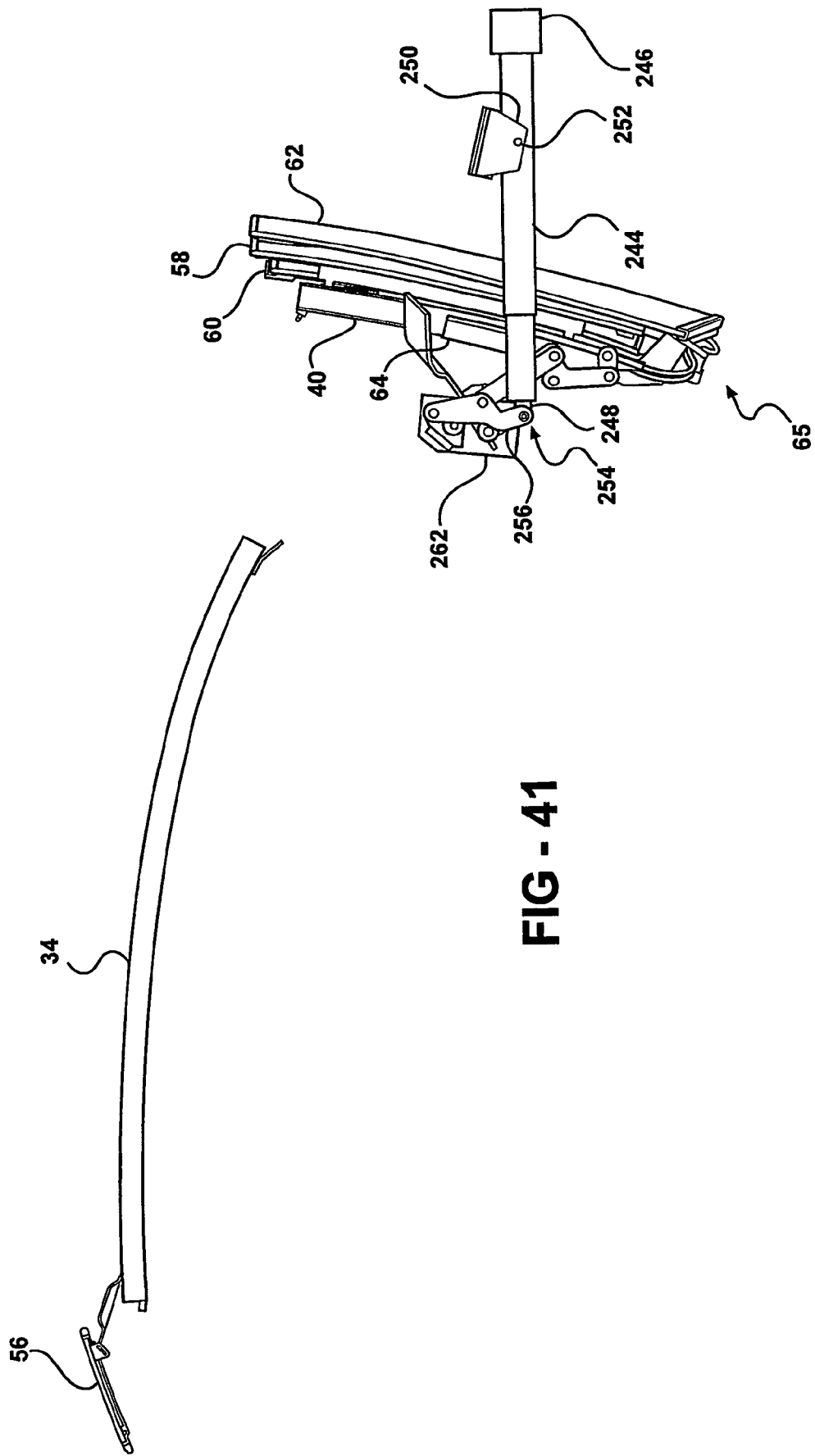
FIG. 41 is a side, perspective view showing the cartridge being further articulating by the linkage assembly.

Referring to FIG. 38, a motor 240 and gearbox 241 is fixedly mounted to the luggage compartment 26. A flexible shaft 242 extends out from the motor 240 and is driven thereby. The flexible shaft 242 is operably connected to an actuator 244 at a back end 246 thereof. The actuator 244 is pivotally coupled to a trunnion bracket 250 about a pin 252. The trunnion bracket 250 is fixedly mounted to a body of the motor vehicle 10. Although a gearbox is disclosed above, it is appreciated that, in the alternative, a pump may be substituted for the gearbox 241 in order to activate the actuator 244 by hydraulic means.

A front end 248 of the actuator 244 is connected to a linkage assembly, generally indicated at 254, which is operably coupled to the movable rail 40 and the panel support structure to move the panels 58, 60, 62 to a stowed position. The linkage assembly 254 includes a bell crank 256 extending between a rearward end 258 and a forward end 260. The rearward end 258 of the bell crank 256 is pivotally coupled to the front end 248 of the actuator 244. The forward end 260 of the bell crank 256 is pivotally coupled to a main pivot mounting bracket 262, which is fixedly secured to the body of the motor vehicle 10.

A power link 264 is pivotally coupled to the bell crank 256 at one end, and pivotally coupled to a main control link 266 at an opposing end. The main control link 266 is also pivotally coupled to the panel support structure 64 and to the main pivot mounting bracket 262. The main control link 266 is further pivotally coupled to an idler link 268. The idler link 268 is pivotally coupled to a secondary control link 270, which in turn is pivotally attached to the panel structure support 64. A balance link 272 is pivotally coupled to the main pivot mounting bracket 262 at one end and to the idler link 270 at an opposing end.

Figure 42:
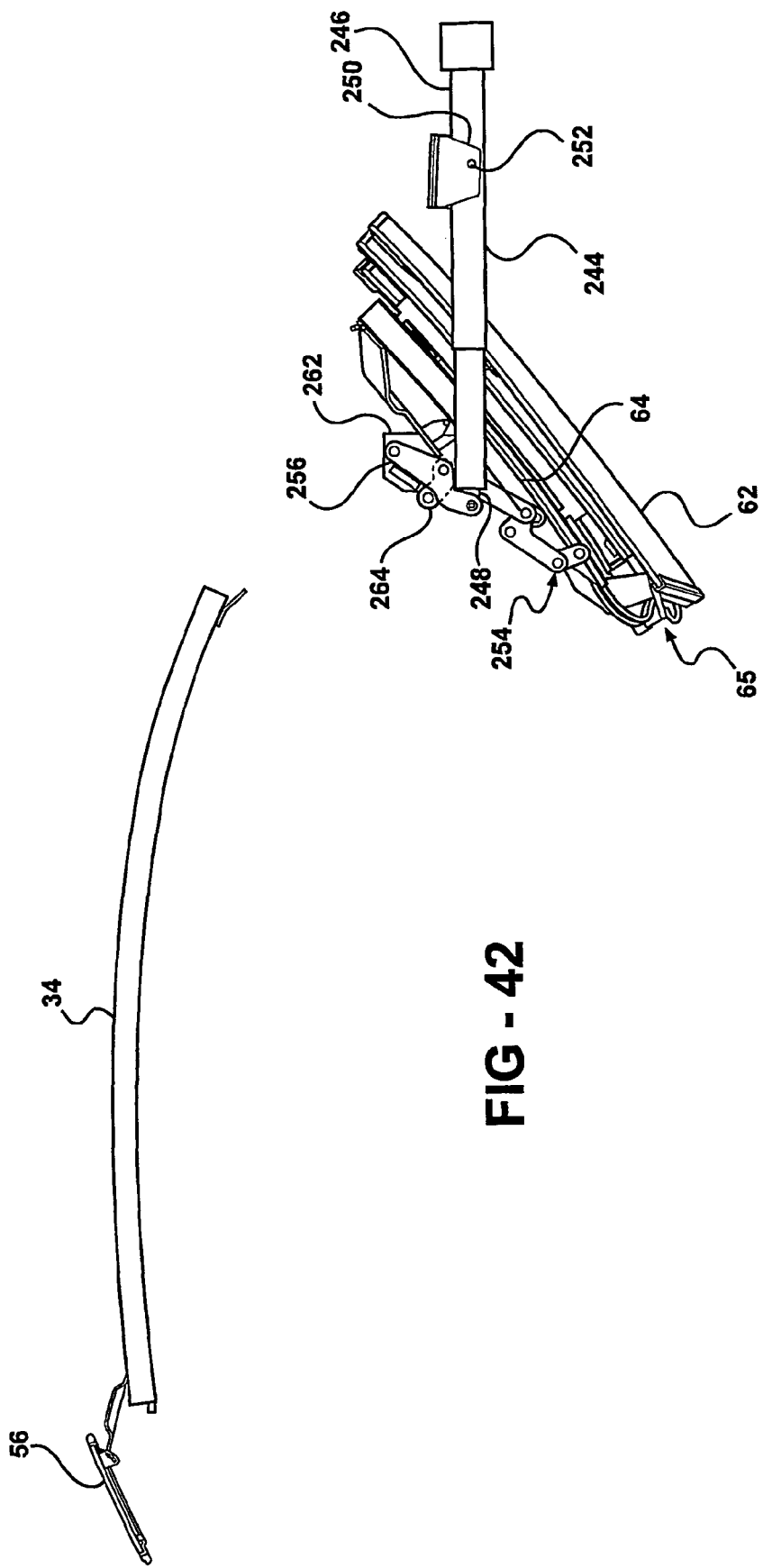
FIG. 42 is a side, perspective view showing the cartridge completely stowed.

The actuation of the actuator 244 initiates downward travel of the linkage assembly 254 to move the cartridge 65 behind the rear seat 24 of the motor vehicle 10. The actuation of the actuator 244 causes the bell crank 256 to pivot about its rearward end 258. As a result, the force from the bell crank 256 is transferred to the main control link 266 via the power link 264. The main control link 266 subsequently controls the remaining downward movement of the panel support structure 64. Thus, the linkage assembly 254 provides for the initial pivotal and subsequent articulating movement of the cartridge 65 to place the panels 58, 60, 62 into the stowed position behind the rear seat 24, as is shown in FIGS. 39 through 42. When the panels 58, 60, 62 are in the stowed position, as shown in FIG. 42, the roof 54 is in the fully open position. After the panels 58, 60, 62 have been moved to the stowed position, the package tray 160 moves back to its use position to close out the trim.

In operation, starting with the roof 54 in the closed position, as shown in FIG. 8, the occupant of the passenger compartment 20 presses either a "sunroof" button to move the roof 54 into the partially open or sunroof position, or a "roof" button to move the roof 54 into the fully open position. As a result, the first motor 70 is activated to drive the first cable 74 rearwardly. As the first cable 74 is driven rearwardly, the sliding pin 91 along the front leg 88 is moved upwardly to the upper end 104 of the elongated slot 100 in the front guide 94. At the same time, the sliding pin 92 along the rear leg 90 is moved upwardly to the upper end 104 of the elongated slot 100 in the front guide 94. Thus, the panel carrier 86 is moved upwards relative to the front 94 and rear 96 guides to raise the first panel 58, as shown in FIG. 11. The first cable 74 then drives the carrier assembly 84 rearwards towards the back end 38 of the fixed rail 34 to move the first panel 58 towards the second panel 60. The raising and rearward movement of the first panel 58 frees the spring 138, which biases the air deflector 56 upwards into its elevated position, shown in FIG. 15. When the first panel 58 covers the second panel 60, the roof 54 is in the sunroof position, as shown in FIG. 19.

If the "sunroof" button was initially activated, the package tray 160 and the third panel 62 will remain in their respective use and neutral positions and there is no further movement of the first 58 and second 60 panels.

If the "roof" button was, however, initially activated, the third motor 178 is activated at the same time that the air deflector 56 moves into its tilted position. The third motor 178 moves the package tray 160 from its use position to its folded position. After the package tray 160 has moved to its folded position, the second motor 72 is activated to lift the third panel 62 into its raised position.

The raised first panel 58 then moves rearwards over the second panel 60 until the catch 112 of the front guide 94 reaches the coupling mechanism 146 of the second panel 60. The striking surface 114 of the catch 112 contacts the plunger 150 of the coupling mechanism 146 to compress a spring 151, which frees the leaf spring 152 to urge the locking member 154 into an engaged position partially within the receiving slot 116. At the same time that the striking surface 114 contacts the plunger 150, the catch 112 picks up the pin 155 within the receiving slot 116, and urges the pin 155 to the distal end 118 of the receiving slot 116. The pin 155 is retained within the receiving slot 116 by the locking member 154, as shown in FIG. 18. Thus, the first 58 and second 60 panels are coupled to one another.

The coupled first 58 and second 60 panels slide rearwardly from the fixed rail 34 to the movable rail 40. As mentioned above, the third panel 62 has been already moved into its raised position. The first 58 and second 60 panels then slide underneath the raised third panel 62, after which the third panel 62 moves to its tucked position. When the third panel 62 is moved to its tucked position, the rail locking mechanism 220 completely withdraws from the opening 228 in the fixed rail 34 to unlock the fixed rail 34 from the movable rail 40. At this time, the movable rail 40 and the first 58, second 60, and third 62 panels, which are now arranged in a stacked configuration, are supported by the panel support structure 64. Together, the panel support structure 64, the first 70 and second 72 motors, the first 74 and second 214 cables, the movable rail 40, the carrier assembly 84, and the panels 58, 60, 62 form a stowable cartridge 65. The fourth motor 240 is then activated to actuate the actuator 244. The actuation of the actuator 244 causes the linkage assembly 254 to initially pivot and subsequently articulate the cartridge 65 into the receptacle 28. As a result, the panels 58, 60, 62 are placed in the stowed position and the roof 54 is in the fully open position. Finally, the package tray 160 is moved back to its use position to cover the receptacle 28 and close out the trim.

Figure 43:
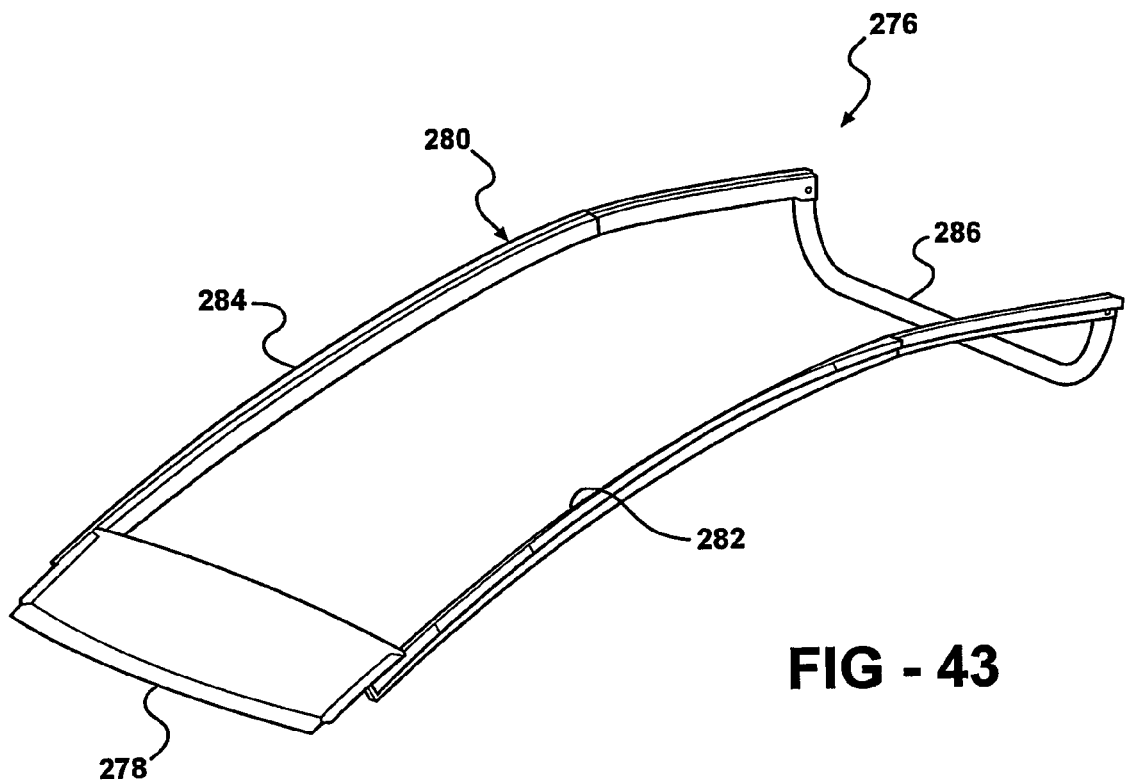
FIG. 43 is a perspective view of a front support module.

Referring to FIG. 43, a front support module, generally shown at 276, includes a header support 278 and a generally U-shaped front support, generally indicated at 280, extending rearwards therefrom. The front support 280 includes a pair of longitudinally extending and spaced apart sides 282, 284 and a cross support 286 extending therebetween.

Figure 44:
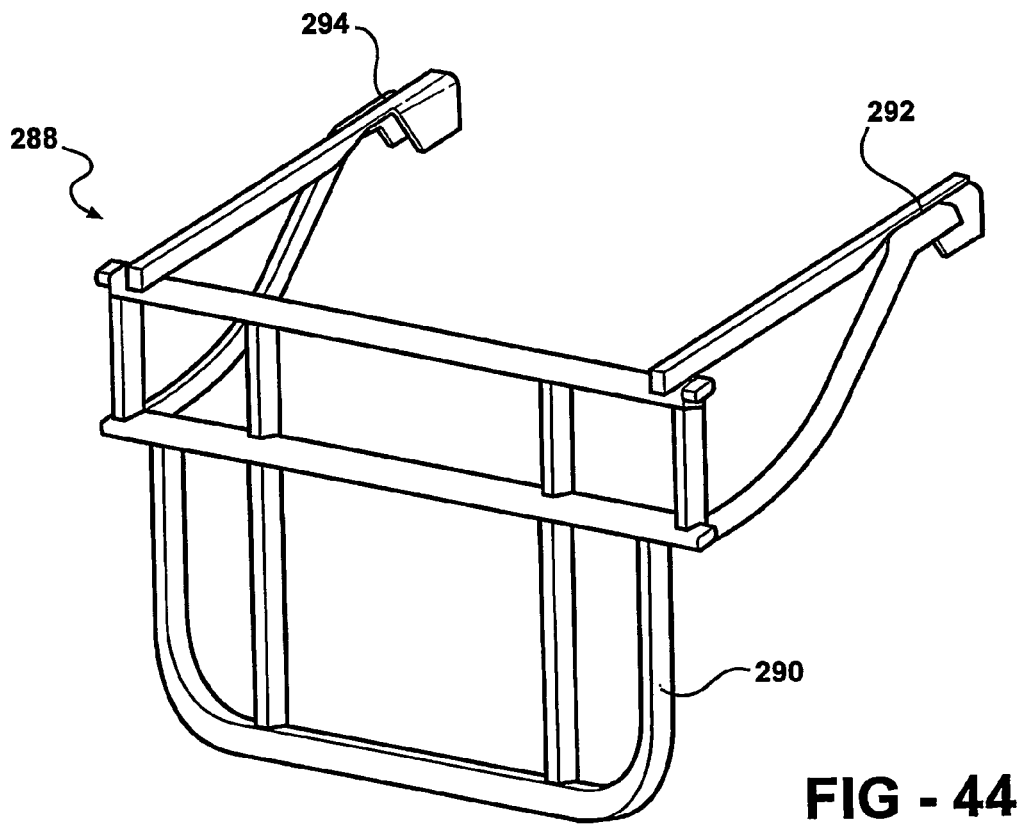
FIG. 44 is a perspective view of a rear support module.

Referring to FIG. 44, a rear support module, generally shown at 288, includes a generally vertical support structure 290 and a pair of spaced apart arm brackets 292, 294 extending out therefrom. The front 276 and rear 288 support modules may be manufactured by any of numerous metal forming processes including, but not limited to, stamping, hydroforming, roll forming, or any combination thereof.

Figure 45:
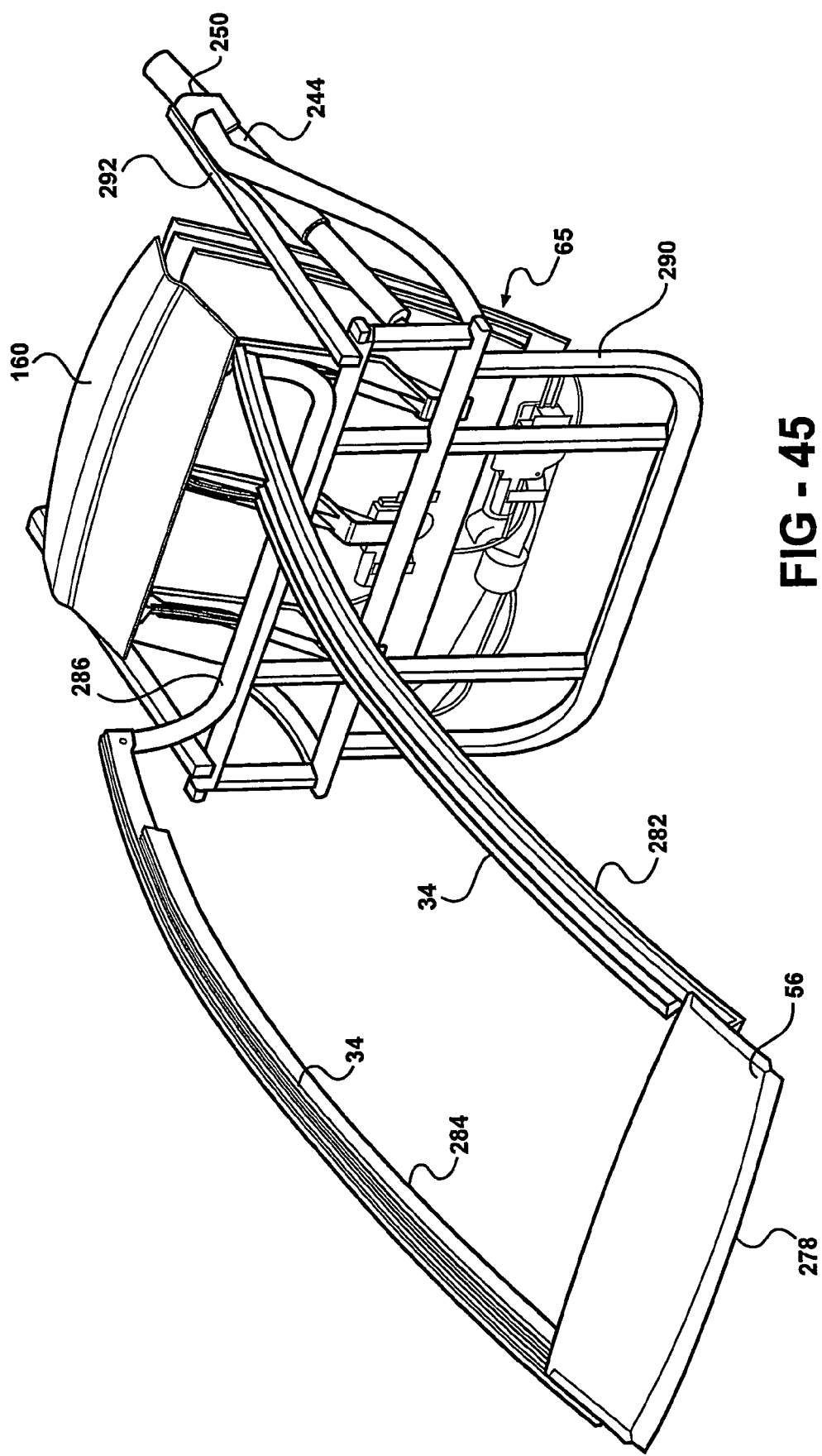
FIG. 45 is a perspective view of the front and rear support modules with various components mounted thereto.

The front 276 and rear 278 support modules allow for easy assembly of the various above-described components away from the motor vehicle 10 prior to installation therein. Referring to FIG. 45, the front support module 276 supports the air deflector 56 along the header support 278, and the fixed rail 34 along each of the spaced apart sides 282, 284. The rear support module 288 supports the cartridge 65, package tray assembly 159, actuator 244, and linkage assembly 254 therealong. More specifically, the trunnion bracket 250 is fixedly mounted to a rear portion of each arm bracket 292, 294, and the main pivot mounting bracket 262 is fixedly mounted to a front portion of each arm bracket 292, 294. For installation, the rear support module 288, with the various components mounted thereto, is first drop loaded into the motor vehicle 10 and fixedly secured thereto. Next, the front support module 276 is drop loaded into the motor vehicle 10 and fixedly secured to the side frame members 30.

Figure 46:
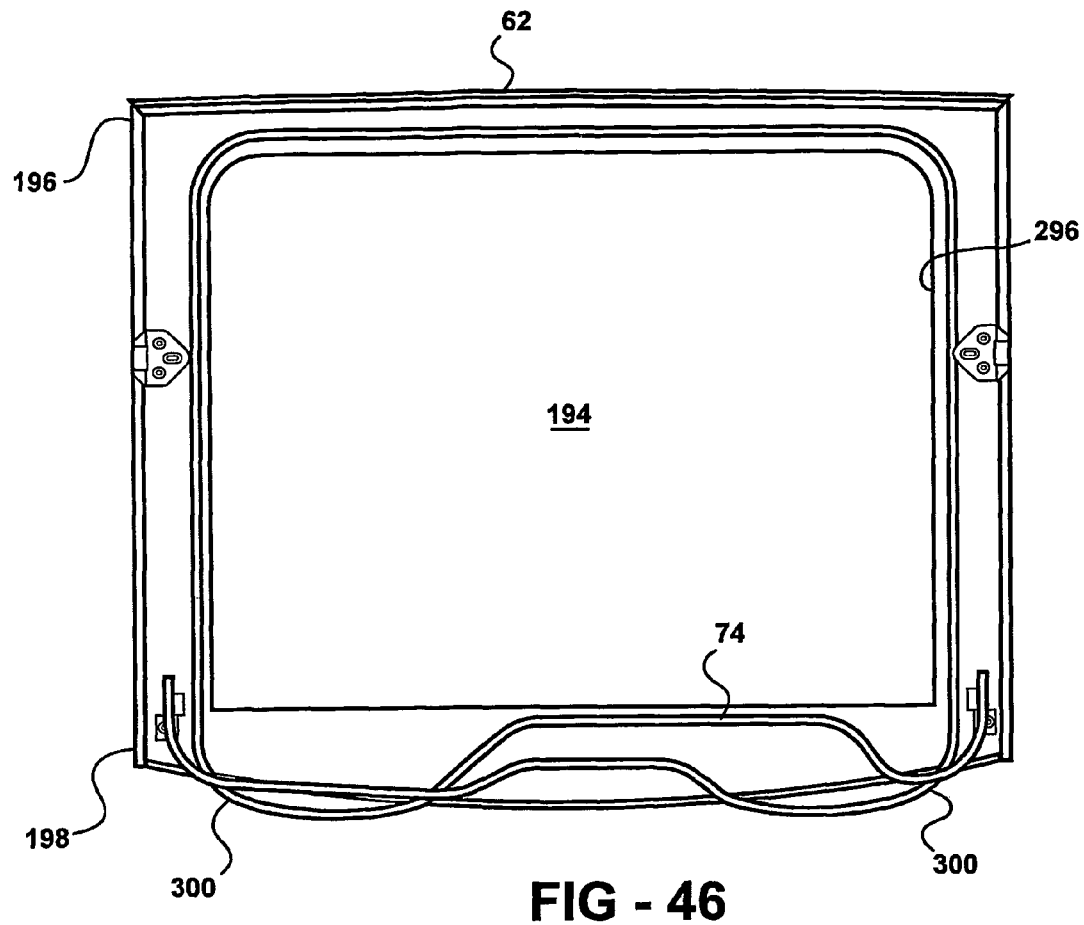
FIG. 46 is a bottom view of the third panel.

Referring to FIG. 46, another feature of the current invention is an encapsulation member 296 that extends along an outer periphery of the third panel 62. The encapsulation member 296 is adhesively bonded to the lower surface 194 of the third panel 62. In the preferred embodiment, the encapsulation member 296 is a plastic material that is molded directly to the third panel 62.

Figure 47:
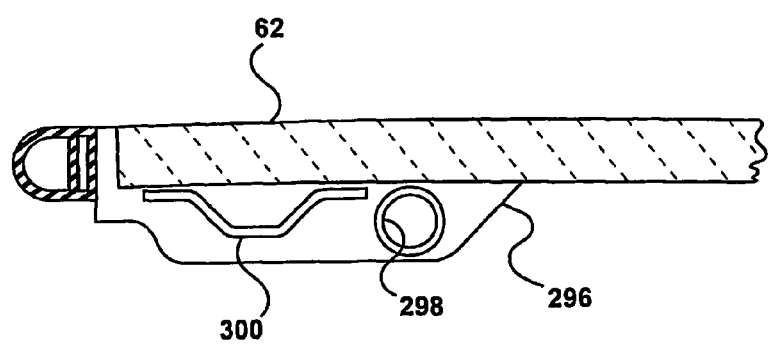
FIG. 47 is a cross-sectional view of FIG. 46 taken along line 47 including a plastic cable encapsulation.

Referring to FIG. 47, the encapsulation member 296 defines a channel 298 that extends along the outer periphery of the third panel 62. The channel 298 receives the first cable 74 therewithin as the first motor 70 drives the first cable 74 rearwards during movement of the roof 54 from the closed position to either the partially open or fully open positions. The storage of the first cable 74 inside the encapsulation member 296 addresses packaging concerns that arise as the panels 58, 60, 62 are moved into the stowed position.

The encapsulation member 296 also houses a reinforcement 300 disposed adjacent the channel 298 and extending along the outer periphery of the third panel 62. The reinforcement 300 provides increased rigidity, which stabilizes the encapsulation member 296 as the first cable 74 is alternately drawn in and forced out of the opening 298. A plurality of plastic overrun tubes 302 is coupled to the third panel 62 at the rear end 198 thereof. The overrun tubes 302 fit around the steel first cable 74 to provide flexibility thereto so that the third panel 62 is not restricted as it is raised and lowered.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A retractable roof assembly for a motor vehicle having a rear seat and spaced apart roof side frame members defining a roof opening, said retractable roof assembly comprising:
   a split rail assembly including a fixed rail adapted to be fixedly secured to each of the roof side frame members and extending along a portion thereof, and a movable rail extending rearward of said fixed rail along a remaining portion of each of the roof side frame members;
   a plurality of roof panels extending between the roof side frame members and slidably engaging said split rail assembly for selective movement into a stacked configuration above said movable rail;
   a panel support structure fixedly secured to said movable rail to support said movable rail and said plurality of roof panels in said stacked configuration; and
   a linkage assembly pivotally connected to said panel support structure for pivoting and articulating said movable rail and said panel support structure relative to said fixed rail when said plurality of roof panels is in said stacked configuration in order to stow said plurality of roof panels behind the rear seat of the motor vehicle such that the entire roof opening is exposed.

2. A retractable roof assembly as set forth in claim 1 wherein said plurality of roof panels includes a forward first roof panel, an intermediate second roof panel, and a rearward third roof panel.

3. A retractable roof assembly as set forth in claim 2 including a carrier assembly coupled to said first roof panel and slidably coupled to said split rail assembly for selectively moving said first and second roof panels to a location above said movable rail such that said plurality of panels is in said stacked configuration.

4. A retractable roof assembly as set forth in claim 3 including a coupling mechanism secured to said second roof panel for selectively coupling said first and second roof panels to one another.

5. A retractable roof assembly as set forth in claim 4 including an actuator operably connected to said linkage assembly for actuating pivotal and articulating movement of said plurality of panels behind the rear seat of the motor vehicle.

6. A retractable roof assembly as set forth in claim 5 including a package tray assembly having a package tray selectively movable to a folded position for allowing stowage of said plurality of panels behind the rear seat.

7. A retractable roof assembly as set forth in claim 3 wherein said carrier assembly includes spaced apart front and rear guides slidably engaging said split rail assembly for moving said first roof panel back and forth along said split rail assembly.

8. A retractable roof assembly as set forth in claim 7 wherein each of said front and rear guides includes an elongated slot.

9. A retractable roof assembly as set forth in claim 8 wherein said carrier assembly includes spaced apart front and rear legs fixedly secured to said first roof panel and slidably engaging said elongated slots of said respective front and rear guides for selectively raising said first roof panel and allowing rearward movement thereof over a portion of said second roof panel.

10. A retractable roof assembly as set forth in claim 2 including a slide mechanism slidably engaging said movable rail and operably connected to said third roof panel.

11. A retractable roof assembly as set forth in claim 10 including a pivot arm pivotally interconnected between said slide mechanism and said third panel such that sliding movement of said slide mechanism selectively lifts said third panel to receive said first and second panels thereunder to position said plurality of panels in said stacked configuration.

12. A retractable roof assembly as set forth in claim 11 including an air deflector disposed forward of said first roof panel and selectively held down thereby.

13. A retractable roof assembly as set forth in claim 1 including a receptacle disposed behind the rear seat for receiving said plurality of roof panels.

14. A split rail assembly for a motor vehicle having spaced apart roof side frame members defining a roof opening and a plurality of roof panels selectively extending between the roof side frame members to cover the roof opening, said split rail assembly comprising:
a fixed rail adapted to be fixedly secured to each of the roof side frame members and extending along a portion thereof;
a movable rail extending rearward of said fixed rail along a remaining portion of each of the roof side frame members, said movable rail pivotal relative to said fixed rail for moving the plurality of roof panels away from the roof side frame members to expose the roof opening; and
a rail locking mechanism coupled to one of said fixed and movable rails and selectively locking said movable rail to said fixed rail.

15. A split rail assembly as set forth in claim 14 including a panel support structure fixedly secured to said movable rail for supporting the plurality of panels during pivotal movement of said movable rail relative to said fixed rail.

16. A split rail assembly as set forth in claim 14 wherein said fixed rail includes a locking tab extending out therefrom.

17. A split rail assembly as set forth in claim 16 wherein said movable rail includes a locator pin for engaging said locking tab to align said fixed and movable rails to one another as said rail locking mechanism locks said movable rail to said fixed rail.

18. A retractable roof for a motor vehicle having a pair of spaced apart roof side frame members defining a roof opening and a rear seat, said retractable roof comprising:
a fixed rail adapted to be fixedly secured to each of the roof side frame members and extending along a portion thereof;
a movable rail extending rearward of said fixed rail along a remaining portion of each of the roof side frame members, said movable rail pivotal relative to said fixed rail;
a plurality of roof panels movable between a closed position covering the roof opening, an intermediate position partially covering the roof opening, and a stowed position behind the rear seat to expose the entire roof opening, said plurality of roofs panels positionable in a stacked configuration above said movable rail;
a mounting bracket adapted to be fixedly secured to the motor vehicle; and
a linkage assembly pivotally coupled to said mounting bracket and operably connected to said plurality of roof panels for pivoting said plurality of roof panels when positioned in said stacked configuration into said stowed position behind the rear seat of the motor vehicle.

19. A retractable roof as set forth in claim 18 including an actuator operably coupled to said linkage assembly for actuating pivotal movement of said plurality of panels into said stowed position.

20. A retractable roof as set forth in claim 19 including a panel support structure for supporting said plurality of panels during movement thereof into said stowed position.

21. A retractable roof as set forth in claim 20 wherein said plurality of panels includes a forward first panel, an intermediate second panel, and a rearward third panel.

22. A method of retracting a roof, having first, second, and third roof panels selectively covering a roof opening, into a space behind a rear seat of a motor vehicle, the method comprising the steps of:
(a) moving the first roof panel vertically relative to the second roof panel;
(b) sliding the first roof panel towards the second roof panel to partially open the roof;
(c) coupling the first roof panel to the second roof panel;
(d) moving the coupled first and second roof panels under or over the third roof panel; and
(e) pivoting the first, second, and third roof panels into the space behind the rear seat to expose the entire roof opening.

23. A method as set forth in claim 22, including enabling the vehicle operator to maintain the first roof panel over or under the second roof panel thereby providing an intermediate position partially covering the roof opening.

24. A method as set forth in claim 23 including lifting or lowering the third roof panel relative to the first and second roof panels prior to the step of moving the coupled first and second roof panels over or under the third roof panel.

25. A method as set forth in claim 24 including the step of lifting or lowering the third roof panel relative to the first and second roof panels to stack the first, second, and third panels subsequent to the step of moving the coupled first and second roof panels over or under the third roof panel.

26. A retractable roof assembly for a motor vehicle having a rear seat and spaced apart roof side frame members defining a roof opening, said retractable roof assembly comprising:
a split rail assembly including a fixed rail adapted to be fixedly secured to each of the roof side frame members and extending along a portion thereof, and a movable rail extending rearward of said fixed rail along a remaining portion of each of the roof side frame members;

a first roof panel slidingly engaging said split rail assembly;

a second roof panel slidingly engaging said split rail assembly;

a third roof panel disposed along said split rail assembly and displaced in a vertical direction relative thereto to accommodate said first and second roof panels such that said first, second, and third panels are positioned in a stacked configuration above said movable rail; and a linkage assembly for pivoting and articulating said movable rail relative to said fixed rail when said plurality of roof panels is in said stacked configuration in order to stow said plurality of roof panels behind the rear seat of the motor vehicle such that the entire roof opening is exposed.

27. A retractable roof assembly as set forth in claim 26 including a panel support structure fixedly secured to said movable rail and supporting said movable rail therealong to support said plurality of panels in said stacked configuration.

28. A retractable roof assembly for a motor vehicle having a rear seat and spaced apart roof side frame members defining a roof opening, said retractable roof assembly comprising:

a split rail assembly including a fixed rail adapted to be fixedly secured to each of the roof side frame members and extending along a portion thereof, and a movable rail extending rearward of said fixed rail along a remaining portion of each of the roof side frame members;

a plurality of roof panels extending between the roof side frame members and slidably engaging said split rail assembly for selective movement into a stacked configuration above said movable rail;

a linkage assembly for pivoting and articulating said movable rail relative to said fixed rail when said plurality of roof panels is in said stacked configuration in order to stow said plurality of roof panels behind the rear seat of the motor vehicle such that the entire roof opening is exposed; and an actuator operably connected to said linkage assembly for actuating pivotal and articulating movement of said plurality of panels behind the rear seat of the motor vehicle.

* * * * *